US011053641B2

(12) United States Patent
Tan et al.

(10) Patent No.: US 11,053,641 B2
(45) Date of Patent: Jul. 6, 2021

(54) MODIFIED CREPING ADHESIVE FORMULATION AND CREPING METHODS USING SAME

(71) Applicant: Buckman Laboratories International, Inc., Memphis, TN (US)

(72) Inventors: Jian Tan, Bartlett, TN (US); Daniel E. Glover, Brighton, TN (US)

(73) Assignee: BUCKMAN LABORATORIES INTERNATIONAL, INC., Memphis, TN (US)

( * ) Notice: Subject to any disclaimer, the term of this patent is extended or adjusted under 35 U.S.C. 154(b) by 0 days.

(21) Appl. No.: 16/358,730

(22) Filed: Mar. 20, 2019

(65) Prior Publication Data

US 2019/0292729 A1 Sep. 26, 2019

Related U.S. Application Data

(60) Provisional application No. 62/646,419, filed on Mar. 22, 2018.

(51) Int. Cl.
D21H 21/14 (2006.01)
D21H 27/00 (2006.01)
D21H 17/36 (2006.01)
D21H 17/53 (2006.01)
D21H 17/07 (2006.01)
D21F 5/18 (2006.01)
B31F 1/12 (2006.01)
D21H 17/34 (2006.01)
C09J 11/06 (2006.01)
C09J 11/08 (2006.01)
D21H 17/00 (2006.01)
C08K 5/3445 (2006.01)

(52) U.S. Cl.
CPC .......... D21H 21/146 (2013.01); B31F 1/12 (2013.01); C09J 11/06 (2013.01); C09J 11/08 (2013.01); D21F 5/181 (2013.01); D21F 5/184 (2013.01); D21H 17/07 (2013.01); D21H 17/34 (2013.01); D21H 17/36 (2013.01); D21H 17/53 (2013.01); D21H 17/72 (2013.01); D21H 27/002 (2013.01); C08K 5/3445 (2013.01)

(58) Field of Classification Search
None
See application file for complete search history.

(56) References Cited

U.S. PATENT DOCUMENTS

| 2,926,116 A | 2/1960 | Keim |
| 3,301,746 A | 1/1967 | Sanford et al. |
| 3,640,841 A | 2/1972 | Winslow et al. |
| 3,879,257 A | 4/1975 | Gentile et al. |
| 3,926,716 A | 12/1975 | Bates |
| 3,997,489 A | 12/1976 | Coker |
| 4,063,995 A | 12/1977 | Grossman |
| 4,300,981 A | 11/1981 | Carstens |
| 4,304,625 A | 12/1981 | Grube et al. |
| 4,440,898 A | 4/1984 | Pomplun et al. |
| 4,501,640 A | 2/1985 | Soerens |
| 4,528,316 A | 7/1985 | Soerens |
| 4,684,439 A | 8/1987 | Soerens |
| 4,788,243 A | 11/1988 | Soerens |
| 4,883,564 A | 11/1989 | Chen et al. |
| 4,886,579 A | 12/1989 | Clark et al. |
| 4,994,146 A | 2/1991 | Soerens |
| 5,025,046 A | 6/1991 | Soerens |
| 5,179,150 A | 1/1993 | Furman, Jr. et al. |
| 5,187,219 A | 2/1993 | Furman, Jr. |
| 5,234,547 A | 8/1993 | Knight et al. |
| 5,246,544 A | 9/1993 | Hollenberg et al. |
| 5,326,434 A | 7/1994 | Carevic et al. |
| 5,370,773 A | 12/1994 | Luu et al. |
| 5,374,334 A | 12/1994 | Sommese et al. |
| 5,382,323 A | 1/1995 | Furman, Jr. et al. |
| 5,437,766 A | 8/1995 | Van Phan et al. |
| 5,468,796 A | 11/1995 | Chen et al. |
| 5,487,813 A | 1/1996 | Vinson et al. |
| 5,490,903 A | 2/1996 | Chen et al. |
| 5,633,309 A | 5/1997 | Warchol et al. |
| 5,660,687 A | 8/1997 | Allen et al. |
| 5,846,380 A | 12/1998 | Van Phan et al. |
| 5,888,347 A | 3/1999 | Engel et al. |
| 5,902,862 A | 5/1999 | Allen |
| 5,942,085 A | 8/1999 | Neal et al. |
| 5,944,954 A | 8/1999 | Vinson et al. |
| 6,465,047 B1 | 10/2002 | Scott et al. |
| 6,991,707 B2 | 1/2006 | Hill, Jr. et al. |

(Continued)

OTHER PUBLICATIONS

EO/PO Block Copolymers, Product Brochure, PCC Exol SA, no date, [online], retrieved from the Internet, [retrieved Aug. 18, 2020], <URL:https://files.mutualcdn.com/alfa-chemicals/brochures/product-ranges/PCC-EXOL_Block-Copolymer-Series_Catalogue_EN_03.2018.pdf>. (Year: 2020).*

Tyagi et al, Imidazoline and Its Derivatives, J.Oleo Sci,56(5),2007,pp. 211-222. (Year: 2007).*

International Search Report and Written Opinion issued in corresponding International Patent Application No. PCT/US2019/023048 dated Jul. 15, 2019 (11 pages).

Voith, "ATMOS technology—Premium tissue with high absorbency and bulk," https://www.voith.com/paper, pp. 1-4 (6 pages) (No date).

(Continued)

Primary Examiner — Dennis R Cordray
(74) Attorney, Agent, or Firm — Kilyk & Bowersox, P.L.L.C.

(57) ABSTRACT

A modified creping adhesive formulation is described that includes at least one creping adhesive, and modifier, wherein the modifier is or includes an emulsion of polypropylene glycol, at least one quaternary ammonium compound, and at least one non-ionic surfactant. The present invention is directed to the modifier itself as well. Methods of creping using the formulation are also described.

26 Claims, 6 Drawing Sheets

(56) References Cited

U.S. PATENT DOCUMENTS

| | | |
|---|---|---|
| 7,404,875 B2 | 7/2008 | Clungeon et al. |
| 7,718,035 B2 | 5/2010 | Boettcher et al. |
| 7,943,705 B2 | 5/2011 | Allen |
| 8,147,649 B1 | 4/2012 | Tucker et al. |
| 2004/0060675 A1 | 4/2004 | Archer et al. |
| 2011/0284176 A1 | 11/2011 | Ringold et al. |
| 2014/0190644 A1 | 7/2014 | Townsend |
| 2016/0168798 A1* | 6/2016 | Choi .................. D21F 5/02 162/111 |

OTHER PUBLICATIONS

Metso, "Advantage NTT Technology—Tissue with high bulk and softness," https://www.metsopaper.com, pp. 1-8 (2011).

Dow, "TERGITOL XD Surfactant," Product Information, Nov. 2009, (2 pages) (Nov. 2009).

\* cited by examiner

MODIFIED CREPING ADHESIVE FORMULATION AND CREPING METHODS USING SAME

This application claims the benefit under 35 U.S.C. § 119(e) of prior U.S. Provisional Patent Application No. 62/646,419 filed Mar. 22, 2018, which is incorporated in its entirety by reference herein.

The present invention relates to formulations and, in particular, adhesive formulations, such as creping adhesive formulations or Yankee dryer coating compositions. The present invention further relates to methods for creping that include such formulations and methods to impart tack and release characteristics and/or properties to the creped product. For purposes of the present invention, a reference to Yankee dryer includes rotary dryers in general for creping. A reference to Yankee coating, Yankee surface, and the like, includes rotary dryer coatings and surfaces.

BACKGROUND OF THE INVENTION

To form a thin paper web from a slurry of water and fiber, the wet web is dewatered, and then the dewatered web is at least partially dried. In the manufacture of tissue and similar paper products, creping is commonly used on such dewatered webs to impart desirable properties, such as softness and bulk. Creping is typically accomplished by conveying or carrying the web on a fabric to a heated rotary drum, sometimes referred to as a Yankee dryer. The web commonly is transferred to an adhesive dryer surface of the dryer and carried around a major circumferential portion of the dryer before the web reaches a zone of web de-contact from the drum. The de-contact zone is equipped with a creping blade against which the web abuts so as to be pushed backwardly or compacted upon itself in a machine direction of the web and attain the well-known tissue crepe paper structure, at which point the resulting creped web is removed from the dryer and collected, usually in rolled up form.

Before the web is transferred to the Yankee dryer, typically an adhesive composition, sometimes referred to as a "coating package" in the industry, is applied directly to the dryer surface of the dryer to form the adhesive dryer surface. The creping action typically requires some adhesion of the web to the outer surface of the dryer to effect a consistent and uniform creping action. Creping adhesives alone or in combination with release agents or other adjuvants have been applied either to the web or to the surface of the dryer in efforts to provide some balance of adhesion and release between the web and the dryer surface for purposes of drying and creping.

Various properties of the creping adhesive can be factors in the creping performance obtained. The level of adhesion of the creping adhesive to the drum dryer surface can be another factor which affects creping performance and results. Inadequate adhesion can result in poor creping, sheet floating, poor sheet handling, or other problems, whereas excessive adhesion may result in crepe blade picking, web plugging behind the crepe blade, web breaks due to excessive tension, or other problems.

Various types of creping adhesives have been used to adhere fibrous webs to rotary dryers such as Yankee dryers. Natural (unmodified) starch has been used in the past, which has been replaced by other chemistries over the years for many reasons. Natural starch cannot reach a high solid content with acceptable viscosity after cooking. Natural starch needs on-site cooking equipment and the equipment is expensive and needs significant maintenance work, such as runability and bacteria issues. Cooked natural starch contains tiny gel balls that make it hard to spray the material onto a Yankee surface and difficult to form a uniform film. Further, natural starch has limited Yankee protection ability and bonding strength. In place of natural starch, creping adhesives have included, for example, polyvinyl acetate-ethylene copolymer emulsions and aqueous polyvinyl alcohol solutions. It has been found that conventionally used polyvinyl acetate-ethylene copolymer compositions, which may contain small percentages of polyvinyl alcohol such as less than about 5% of the total solids by weight, may be generally adequate for the purpose but can cause a number of undesirable effects, such as blocking problems and others as mentioned in U.S. Pat. No. 6,991,707 B2, which is incorporated herein by reference in its entirety. Polyvinyl alcohol compositions (which may contain some polyvinyl acetate) can pose similar problems when used as creping adhesives, and can tend to coat the dryer with a hard and uneven film that builds up as drying and creping proceed, resulting in uneven creping or other problems.

Other creping adhesives have included wet strength resins, such as polyamide epichlorohydrin (PAE), poly(amidoamine) epichlorohydrin (PAAE), and polyethyleneimine (PEI). PAE and PAAE resins are described, for example, in U.S. Pat. Nos. 2,926,116; 7,404,875 B2; 7,943,705 B2; and 7,718,035 B2.

There is a need for coating formulations that are versatile enough to be used on conventional Yankee rolls, as well as with TAD fabrics and other modes of operation used for drying and creping wet tissue webs. In a typical through-air drying (TAD) operation, for instance, a web formed from a slurry of water and fiber is dewatered without significantly mechanically pressing the wet web, such as by vacuum drying. This is followed by a drying action using a hot air blast. The resulting webs can be transferred to a surface of a Yankee dryer for creping using a knuckled fabric so that the web adheres to the dryer in closely spaced zones, with bulking of the web between the zones. Alternatively, many desirable properties of creped tissue can be imparted without Yankee creping. For instance, a wet tissue web can be foreshortened while still moist in a process referred to as rush transfer, which can be used as part of a TAD operation without use of a Yankee drum. As shown for example in U.S. Pat. No. 5,888,347, a wet tissue web can be transferred from a forming section wire to a second slower-moving transfer fabric under carefully controlled conditions to foreshorten a moist paper web before it is transferred to a TAD fabric and through-dried to final dryness. The transferred moist tissue web can be placed on a TAD fabric that has a three-dimensional structure, after which hot air can be passed through the web to dry the web in a morphology corresponding to that of the TAD fabric, producing a web that can have improved softness without use of Yankee drying/creping.

Improved coating formulations are needed for tissue drying and creping processes. Particularly, it would be desirable to provide a formulation that can be used with a standard creping adhesive, like polyvinyl alcohol, to modify the creping adhesive so as to improve one or more properties without significantly affecting any desirable property of the creping adhesive.

SUMMARY OF THE PRESENT INVENTION

It is a feature of the present invention to provide improved adhesive formulations and/or concentrates useful in preparing them.

A further feature of the present invention is to provide a temperature resistant and/or storage stable formulation which can be diluted.

An additional feature of the present invention is to provide a modified creping adhesive formulation that can modify polyvinyl alcohol (or other creping adhesive) and preferably improve at least one property of the polyvinyl alcohol (or other creping adhesive).

A further feature of the present invention is to provide a modified creping adhesive formulation used in Yankee coatings or through-air drying (TAD) machines or ATMOS machines or NTT machines, so as to improve at least one property of the overall adhesive formulation and/or the use of these technologies.

An additional feature of the present invention is to provide a creping adhesive formulation that has an improved tack profile performance, wherein the adhesive can impart high initial (wet) tack with tissue webs undergoing drying in the formation of a creped product on a Yankee dryer and reduced tack to release the dried web at a creping blade.

A further feature of the present invention is to provide an adhesive formulation that can be used in through-air modes of operation of paper making that can be used in forming a creped web product.

Additional features and advantages of the present invention will be set forth in part in the description that follows, and in part will be apparent from the description, or may be learned by practice of the present invention. The objectives and other advantages of the present invention will be realized and attained by means of the elements and combinations particularly pointed out in the description and appended claims.

One or more of the foregoing features have been accomplished in accordance with this invention by providing a modified creping adhesive formulation containing at least one creping adhesive and a modifier. The modifier is or includes an emulsion of polypropylene glycol, at least one quaternary ammonium compound, and at least one non-ionic surfactant. The modified creping adhesive formulation can include two different non-ionic surfactants. The modified creping adhesive formulation can further include water. The modified creping adhesive formulation can be a formulation where the creping adhesive is or includes polyvinyl alcohol.

The present invention further relates to a process of creping that includes the use of the adhesive formulation of the present invention. For instance, the process for creping a fiber web can comprise providing a rotating cylindrical dryer or similar roller, including a dryer surface. A modified creping adhesive formulation comprising the indicated formulation is applied to the dryer surface, and a fiber web is conveyed to the dryer surface. The fiber web is dried on the dryer surface to form a dried fiber web, and the dried fiber web is creped from the dryer surface. As an option, the fiber web to be creped can be through-air dried before transfer to a Yankee dryer surface that has been pre-coated with the modified creping adhesive formulation. The modified creping adhesive formulation of the present invention can be used in other applications in the paper industry or other industries, such as a TAD fabric coating in through-air drying processes, or ATMOS technology or NTT technology.

The present invention further relates to a process of creping that includes the use of the modified creping adhesive formulation of the present invention which comprises through-air drying without use of a Yankee dryer. A process of making a creped fiber web can comprise applying a formulation comprising the modified creping adhesive formulation to a TAD fabric to provide a coated surface. The TAD fabric can be arranged in an endless loop such that the TAD fabric passes around a foraminous dryer roll of a through-air dryer (TAD). A fiber web can be transferred to the coated surface of the TAD fabric, and the coated TAD fabric with the fiber web can be carried thereon around the dryer roll with passing of heated air through the fiber web to provide a dried web without drying of the fiber web on a Yankee dryer. The dried web can be separated from the TAD fabric for collection of the dried web, wherein the dried web comprises at least one creped property.

It is to be understood that both the foregoing general description and the following detailed description are exemplary and explanatory only and are intended to provide a further explanation of the present invention, as claimed.

The accompanying drawings, which are incorporated in and constitute a part of this application, illustrate some of the features of the present invention and together with the description, serve to explain the principles of the present invention.

DETAILED DESCRIPTION OF THE PRESENT INVENTION

Figure 1:
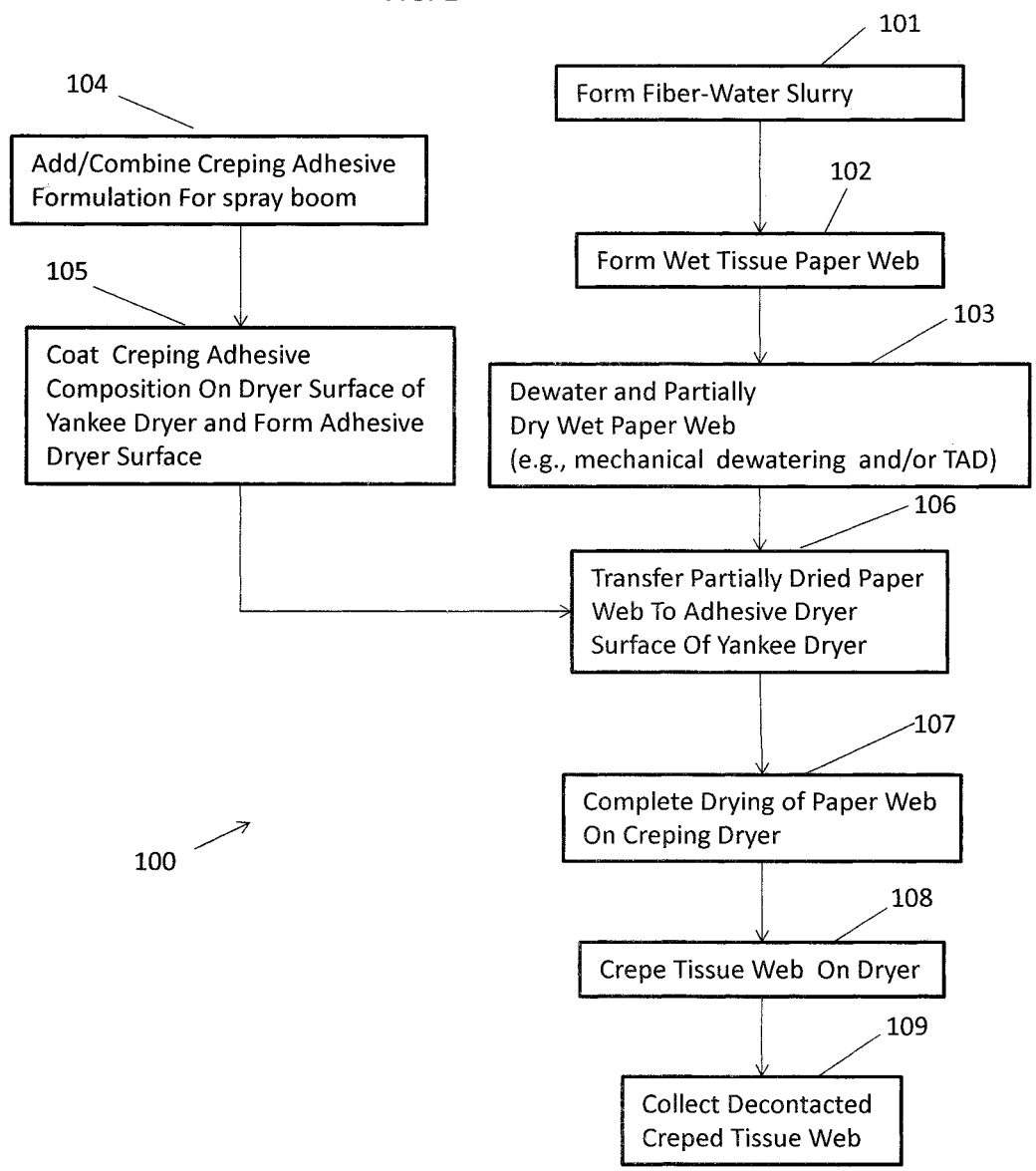
FIG. 1 is a process flow chart illustrating a process according to the present invention.

The present invention relates to adhesive formulations, such as creping adhesive formulations or Yankee dryer coating compositions or a through-air drying (TAD) fabric coatings, or ATMOS coatings or NTT coatings. The adhesive formulations can provide tack and release characteristics to a fiber web, when the fiber web is on the Yankee dryer or dryer surface. The formulations of the present invention can be useful as TAD or ATMOS or NTT fabric tack and release aids.

The adhesive formulation can be used as a creping adhesive. One type of creping is with a traditional Yankee roll or metal roller where coatings are applied onto a rotatable cylindrical drum and then the tissue to be creped is placed on the drum for drying before creping and collection of the dried creped web off the drum. A second type of creping can comprise through-air drying (TAD). In TAD, a wet fiber web that can be creped or foreshortened is through-air dried with a hot air blast instead of mechanically pressing for dewatering. A TAD fabric can be used to carry the wet tissue web through one or more hot air dryers and impress a structured three-dimensional surface pattern into the wet web. A TAD can be coated with an adhesive/release formulation before the wet web is transferred onto the TAD fabric for TAD processing. Alternatively, or in addition, the adhesive formulation can be used as a creping adhesive with ATMOS and/or NTT machines and technologies.

The modified adhesive formulation of the present invention comprises, consists essentially of, consists of, includes or is a) at least one creping adhesive and b) a modifier. The modifier comprises, consists essentially of, consists of, includes or is an emulsion of polypropylene glycol, at least one quaternary ammonium compound, and at least one non-ionic surfactant.

With respect to the creping adhesive, one creping adhesive can be used or more than one creping adhesive can be used, such as two creping adhesives, or three creping adhesives, or more. The creping adhesive(s) can be any commercially available adhesive that is used in methods of creping. Preferably, at least one of the creping adhesives is or includes a polyvinyl alcohol.

The creping adhesive can be present in an amount of from about 90 wt % to about 99.5 wt %, such as from about 95 wt % to about 99.5 wt % or from about 97 wt % to about 99.5 wt % or from about 98 wt % to 99.5 wt % based on the total weight percent of the modified creping adhesive. The creping adhesive can be present in an amount of from about 85 wt % to about 99 wt % and the modifier can be present in an amount of from about 1 wt % to about 15 wt %, based on total weight of the modified creping adhesive formulation.

The creping adhesive in the modified creping adhesive formulation of the present invention can be or include at least one crosslinkable polymer in combination therewith. One or two or three or more than three different creping adhesives can be present. Crosslinkable polymers or creping adhesives can include, for example, crosslinkable natural polymers, crosslinkable synthetic polymers, crosslinkable thermoplastic polymers, or thermosetting polymers, or any combinations thereof. The crosslinkable polymers can be, for example, homopolymers, copolymers, block copolymers, multi-stage polymers, star polymers, or any combinations thereof. Non-limiting examples of polymer chemistries include, but are not limited to, ethylene vinyl acetate polymers, acrylic homopolymers and copolymers, vinyl acetate homopolymers, polyamides, polyvinyl alcohols, starches, cellulosics, poly(aminoamide)-epichlorohydrins (PAAEs), polyamide epichlorohydrin polymers, polyethyleneimine polymers, ionene polymers, polymeric quaternary ammonium compounds (polyquats), or other polymers, or any combinations thereof. The polymer can be functionalized to provide crosslinking functionality. Other crosslinkable polymers which may be used include those mentioned, for example, in U.S. Pat. No. 5,246,544, which is incorporated herein by reference in its entirety.

Polyvinyl alcohols and/or wet strength resins that are PAAE-based are two preferred categories of crosslinkable resin which can be used. Polymers which can be used include, for example, BUBOND® series modified PAAE products, such as BUBOND® 2620, BUBOND® 2624, sold by Buckman Laboratories International Inc., Memphis, Tenn. USA. Crosslinkable or partially crosslinked, partially crosslinkable PAAE type resins may be used. PAAE resins synthesized with a small excess of epihalohydrin with the extent of crosslinking controlled to terminate by the addition of acid before reaching completion can be used, such as mentioned in U.S. Pat. No. 7,718,035 B2, which is incorporated herein by reference in its entirety. CREPETROL® 5318, for example, a commercial PAAE creping adhesive sold by Solenis Incorporated, can be used. A second or more optional polymer which can be used with the crosslinkable polymer can be, for example, a wet strength or hard cationic resin or polymer that is non-crosslinkable or crosslinkable. Another type of optional polymer which may be used can be a soft polymer which has a lot of tack, which may assist edge control at high running speeds. A non-limiting commercial example of such a soft, yet tacky resin is PROSOFT® TC9700, an EPI-crosslinked poly(aminoamide), sold by Solenis Incorporated.

Regarding the emulsion that is part of the modified creping adhesive formulation, the emulsion is an emulsion of a combination of a) polypropylene glycol, b) at least one quaternary ammonium compound, and c) at least one non-ionic surfactant. The emulsion can be present in an amount of from about 15 wt % to about 0.5 wt %, such as from about 10 wt % to about 0.5 wt % or from about 5 wt % to about 0.5 wt % or from about 3 wt % to 0.5 wt %, or from about 2 wt % to about 3.5 wt %, based on the total weight percent of the modified creping adhesive.

As stated, the modifier comprises, consists essentially of, consists of, includes, or is an emulsion of a) polypropylene glycol, b) at least one quaternary ammonium compound, and c) at least one non-ionic surfactant.

With regard to the polypropylene glycol, the polypropylene glycol can be one type of polypropylene glycol or more than one type of polypropylene glycol. For instance, the polypropylene glycol can be a mixture of two or more polypropylene glycols.

The polypropylene glycol can comprise, consist essentially of, consist of, include, or is at least one polypropylene glycol having an average molecular weight of from about 400 to about 10,000 daltons or having an average molecular weight of from about 1,000 to about 3,000 daltons.

For purposes of the present invention, the polypropylene glycol is not a poloxamer. For purposes of the present invention, the polypropylene glycol is not an EO-PO copolymer.

The emulsion can have a solid content. For instance, the solid content of the emulsion can be from about 5 wt % to about 30 wt % or from about 10 wt % to 25 wt % or from about 15 wt % to 25 wt % based on the total weight of the emulsion.

The polypropylene glycol can be commercially available polypropylene glycol. For instance, the polypropylene glycol can be obtained from Dow Chemical or Huntsman Corporation. The polypropylene glycol can be PT700, PT1200, PT2000, or PT 3000 from Dow Chemical.

With respect to the other component of the emulsion, namely the quaternary ammonium compound, one quaternary ammonium compound can be used or more than one quaternary ammonium compound can be used, such as two quaternary ammonium compounds or three or more quaternary ammonium compounds.

The quaternary ammonium compound can comprise, consist essentially of, consist of, include, or is a mono quaternary ammonium compound.

The quaternary ammonium compound can comprise, consist essentially of, consist of, include, or is imidazoline.

The imidazoline that can be or be part of the quaternary ammonium compounds used, can be a reaction product of diethylene triamine and a fatty acid further reacted with dimethyl sulfate. The fatty acid can be a 12-20 carbon fatty acid. The fatty acid can be or include a saturated and/or unsaturated fatty acid. Examples of fatty acids include, but are not limited to, myristic acid, palmitic acid, stearic acid, arachidic acid, behenic acid, oleic acid, or tall oil fatty acid, and the like.

The imidazoline can be a fatty alkyl imidazoline. The fatty alkyl imidazoline for instance can have from 1 to 4 fatty alkyl groups.

The quaternary ammonium compound may be a compound with a single quaternary ammonium group or a polyquaternary ammonium compound. Examples of suitable quaternary ammonium compounds include for example, benzalkonium chloride, (oxydiethyleneglycol)bis(coco alkyl)dimethyl ammonium chloride, which is commercially available in a formulation under the Trademark BUSAN 1014 from Buckman Laboratories International, Inc., N,N-dichlorobenzenesulfonamide (dichloramine B), N,N-diethyl-N-dodecyl-N-benzylammonium chloride, N,N-dimethyl-N-octadecyl-N-(dimethylbenzyl)ammonium chloride, N,N-dimethyl-N,N-didecylammonium chloride, N,N-dimethyl-N,N-didodecylammonium chloride, N,N,N-trimethyl-N-tetradecylammonium chloride, N-benzyl-N,N-dimethyl-N—($C_{12}$-$C_{18}$ alkyl) ammonium chloride, N-(dichlorobenzyl)-N,—N-dimethyl-N-dodecylammonium chloride, N-hexadecylpyridinium chloride, N-hexadecylpyridinium bromide, N-hexadecyl-N,N,N-trimethylammonium bromide, N-dodecylpyridinium chloride, N-dodecylpyridinium bisulphate, N-benzyl-N-dodecyl-N,N-bis(beta-hydroxy-ethyl)ammonium chloride, N-dodecyl-N-benzyl-N,N-dimethylammonium chloride, N-benzyl-N,N-diethyl-N—($C_{12}$-$C_{18}$ alkyl) ammonium chloride, ethyl-n-hexadecyl dimethylammonium bromide, N-dodecyl-N,N-dimethyl-N-ethylammonium ethylsulfate, N-dodecyl-N,N-dimethyl-N-(1-naphthylmethyl) ammonium chloride, N-hexadecyl-N,N-dimethyl-N-benzylammonium chloride or N-dodecyl-N,N-dimethyl-N-benzylammonium chloride. The quaternary ammonium compound can be a polyquaternary ammonium compound.

Further examples of the quaternary ammonium compound include, but are not limited to, the following classes and examples of commercially available products: Monoalkyltrimethyl ammonium salts (Examples of commercially available products include cetyltrimethylammonium bromide or chloride as CTAB, tetradecyltrimethylammonium bromide or chloride (TTA), alkyltrimethyl ammonium chloride, alkylaryltrimethyl ammonium chloride, dodecyltrimethylammonium bromide or chloride, dodecyldimethyl-2-phenoxyethylammonium bromide, hexadecylamine: chloride or bromide salt, dodecyl amine or chloride salt, and cetyldimethylethyl ammonium bromide or chloride), Monoalkyldimethylbenzyl ammonium salts (Examples include alkyldimethylbenzyl ammonium chlorides and benzethonium chloride as BTC), Dialkyldimethyl ammonium salts (Commercial products include domiphen bromide as DB, didecyldimethyl ammonium halides, and octyldodecyldimethyl ammonium chloride or bromide), Heteroaromatic ammonium salts (Commercial products include cetylpyridium halides (CPC or bromide salt and hexadecylpyridinium bromide or chloride), cis-isomer 1-[3-chloroallyl]-3,5,7-triaza-1-azoniaadamantane, alkyl-isoquinolinium bromide, and alkyldimethylnaphthylmethyl ammonium chloride (BTC 1110)). Polysubstituted quaternary ammonium salts (Commercially available products include, but are not limited to, alkyldimethylbenzyl ammonium saccharinate and alkyldimethylethylbenzyl ammonium cyclohexylsulfamate). Bis-quaternary ammonium salts (Examples include 1,10-bis(2-methyl-4-aminoquinolinium chloride)-decane, 1,6-Bis {1-methyl-3-(2,2,6-trimethyl cyclohexyl)-propyldimethyl ammonium chloride]hexane or triclobisonium chloride, and the bis-quat referred to as CDQ by Buckman Brochures).

More specific examples of the quaternary ammonium compound that can be used are dimethyl ditallow ammonium chloride, dimethyl benzyl ammonium chloride, or any combination thereof.

As stated, the modifier also includes at least one non-ionic surfactant. The non-ionic surfactant can be one non-ionic surfactant or more than one non-ionic surfactant such as two non-ionic surfactants or three non-ionic surfactants or four non-ionic surfactants or more. As used herein, a "nonionic surfactant" is an organic compound that is amphiphilic and has no charge group at either terminal end group thereof, wherein the organic compound can lower the surface tension of a liquid, the interfacial tension between two liquids, or that between a liquid and a solid. For purposes of the present invention, a polypropylene glycol is not a non-ionic surfactant.

Examples of the non-ionic surfactant include, but are not limited to, polyalkylene glycol monobutyl ether.

The non-ionic surfactant can be or include an alkyl EO-PO copolymer and/or an EO-PO block copolymer.

The non-ionic surfactant can be i) an alkyl EO-PO copolymer and ii) an EO-PO block copolymer, wherein i) and ii) are different from each other.

The non-ionic surfactant can be i) an alkyl EO-PO copolymer and ii) a poloxamer, wherein i) and ii) are different from each other.

Examples of nonionic surfactants include, but are not limited to, various condensation products of alkylene oxides, such as ethylene oxide (EO), with a hydrophobic molecule. Examples of hydrophobic molecules include fatty alcohols, fatty acids, fatty acid esters, triglycerides, fatty amines, fatty amides, alkylphenols, polyhydric alcohols and their partial fatty acid esters. Other examples include polyalkylene oxide block copolymers, ethylenediamine tetra block copolymers of polyalkylene oxide, and alkyl polyglycosides. Examples include nonionic surfactants that are fatty alcohol ethoxylates where the alcohol is about $C_{10}$ to $C_{18}$ branched or linear, such as the Surfonic™ L (Huntsman Corporation, Houston, Tex.) or TDA series, the Neodol™ (Shell Chemical Company, Houston, Tex.) series and the Tergitol™ series (Union Carbide Corporation, Danbury Conn.). Other examples of nonionic surfactants include alkylphenol ethoxylates, polyethylene glycol esters of long chain fatty acids, ethoxylated fatty amines, polymers containing ethylene oxide and propylene oxide blocks, and alkyl polyglycosides.

The non-ionic surfactant can be or include or contain at least one EO/PO alkoxylate. The EO/PO alkoxylate can have an average molecular weight of from about 1,000 to about 10,000 Daltons. Any desirable ethylene oxide/propylene oxide (EO/PO) alkoxylate can be used. The EO/PO alkoxylate can include any suitable number of ethylene oxide and/or propylene oxide units. For example, the alkoxylate can have from about 2 to about 2,000, from about 10 to about 1,000, from about 25 to about 750, from about 50 to about 500, from about 75 to about 400, from about 100 to about 250, or greater than 2,000 alkylene oxide groups. The alcohol portion of the alkoxylate can be of any suitable length. The alcohol portion can be, for example, methanol, ethanol, propanol, butanol, and the like, or any combination thereof. The alcohol can be a primary alcohol, secondary alcohol, tertiary alcohol, or any combination thereof. The alcohol can be linear, cyclic, saturated, unsaturated, conjugated, substituted, homogenous, heterogeneous, or any combination thereof. The alkoxylate can be a copolymer, block copolymer, random copolymer, alternating copolymer, statistical copolymer, graft copolymer, or any combination thereof. The alkoxylate can include at least one homopolymer, at least one copolymer, or any combination thereof. EO/PO alkoxylates are available, for example, Tergitol XD from Dow Chemical Company, T-Det XD from Harcros Chemicals Kansas City, Kans. Midland, Mich., Perstorp Holding AB, Perstorp, Sweden, INEOS Group AG, Rolle, Switzerland, and Stepan Chemical Company Northfield, Ill.

The nonionic surfactant can be an ethoxylated sorbitan ester, a glyceride ethoxylate, an ethoxylated castor oil, an alcohol ethoxylate, an alkylphenol ethoxylate, a phenol ethoxylate, an amide ethoxylate, a fatty acid ethoxylate, a fatty amine ethoxylate, a fatty amide ethoxylate, a fatty mono or di-ethanolamide, an alkyl glycoside, a polyethylene glycol (PEG), an acetylenic glycol, a poloxamer, an alkali metal arylsulfonate, an ethoxylated fatty amide, or any combination thereof. As an option, the nonionic surfactant can be an ethoxylated sorbitan ester. The ethoxylated sorbitan esters can be commercially obtained as TWEEN or polysorbate series surfactant, such as polysorbate (80) (e.g., (TWEEN 80), polysorbate (20) (e.g., TWEEN 20), polysorbate (40) (e.g., TWEEN 40), or polysorbate 60 (e.g., TWEEN 60). TWEEN 80 is (polyoxyethylene (20) sorbitan monooleate. TWEEN 80, or other nonionic surfactants such as described herein, can improve the tolerance of yeast cells to high ethanol concentration. Commercial sources of the nonionic surfactant, such as polysorbates, which can be used in a nutrient composition of the present invention include, for example, Lumisorb Polysorbates from Lambent Technologies Corporation (Gurnee, Ill. USA). Other suitable nonionic surfactants are ethoxylated castor oils such as castor oil 80 EO. Poloxamers can be nonionic triblock copolymers that comprise a central block of a hydrophobic polyalkyleneoxide block, which is flanked on both sides with hydrophilic polyalkyleneoxide blocks. Poloxamers are commercially available that are food grade. A commercial source of poloxamers are, for example, PLURONIC copolymers from BASF Corporation (Florham Park, N.J., U.S.A.). Other suitable nonionic surfactants are mono-, di- or triglycerides based on fatty acids having 12-22 carbon atoms, or mono-, di- or triesters of sorbitan based on fatty acids having 12-22 carbon atoms. The nonionic surfactant can be used in the nutrient composition in a single type or a combination of two or more surfactants.

The nonionic surfactant can be a poloxamer. Poloxamers can be nonionic triblock copolymers that include a central block of a hydrophobic polyalkyleneoxide block, which is flanked on both sides with hydrophilic polyalkyleneoxide blocks. As an option, the polyalkyleneoxide blocks of the poloxamers can independently comprise lower alkylene oxide chains, such as $C_2$, $C_3$, or $C_4$ alkylene oxide chains. As an option, the poloxamer comprises a central block of polypropyleneoxide (PPO) or polybutyleneoxide (PBO), sandwiched between two blocks of polyethylene oxide (PEO). As an option, the poloxamers can be PEO-PPO-PEO copolymers which can have the general formula I: $HO(C_2H_4O)_a(C_3H_6O)_b(C_2H_4O)_aH$, where a and b are the respective average number of EO and PO monomer units in the applicable PEO and PPO block. The PEO-PPO-PEO structure can be a difunctional block copolymer surfactant which terminates in primary hydroxyl groups. Because of their amphiphilic structure, the poloxamers can have nonionic (i.e., no charge) surfactant properties.

Poloxamers can be synthesized sequentially. For example, a central block can be polymerized first from PO to form PPO, then outer PEO blocks can be added to the ends of the central PPO block in a second polymerization step using EO. A commercial source of poloxamers is, for example, PLURONIC® copolymers from BASF Corporation (Florham Park, N.J., U.S.A.).

The physical properties of the poloxamers can range from low-viscosity liquids to pastes to solid, depending upon the precise combination of molecular weight and PEO:PPO ratio. As an option, the mass ratio of total PEO to the PPO can be from about 1:9 to about 9:1, or from about 1:9 to about 8:2, or from about 2:8 to about 8:2, or from about 2.5:7.5 to about 7.5:2.5, or from about 4:6 to about 6:4, or other values. As an option, the PEO proportion comprises at least a predominant amount (i.e., ≥50%) of the total PEO and PPO content of the poloxamer on a mass basis. As an option, a poloxamer which can be used in compositions and methods of the present invention can comprise a PEO:PPO ratio, on a weight:weight (w/w) basis, of from about 50:50: to about 95:5, or from about 60:40 to about 90:10, or from about 75:25 to about 85:15, or from about 78:22 to about 82:18, or about 80:20, or other values. As an option, the poloxamers can have molecular weights, for example, of from about 1,000 g/mol to about 25,000 g/mol, or from about 2,500 to about 22,500 g/mol, or from about 5,000 g/mol to about 20,000 g/mol, or from about 7,500 g/mol to about 18,000 g/mol, or from about 10,000 g/mol to about 16,000 g/mol, or from about 12,000 g/mol to about 15,000 g/mol, or other values.

The water solubility of nonionic surfactants such as poloxamers can be related to their hydrophilic-lipophilic balance (HLB) value or number. The HLB value can be calculated in a conventional manner. For example, the HLB value of a poloxamer can be calculated by dividing the molecular weight percent of the hydrophilic portion of the poloxamer by five. For example, a poloxamer containing 80 mole % PEO (total) would have an HLB value calculated to be 16 (i.e., 80/5=16). HLB values that exceed 20 are relative or comparative values. The presence of the hydrophilic PEO terminal portions in the poloxamers means that the surfactant molecules normally have a HLB value which is greater than zero, i.e., they have some hydrophilic character. PPO can have an HLB value close to zero, e.g., less than 0.5. As an option, where the PEO content of the poloxamers comprises a predominant amount of the copolymer, the hydrophilic character of the copolymer can be expected to be more than the molecule's lipophilic character. As an option, the HLB values of poloxamers which contain a predominant amount of PEO can be, for example, at least about 10, or at least about 11, or at least about 12, or at least about 13, or at least about 14, or at least about 15, or at least about 16, or at least about 17, or at least about 18, or at least about 19, or from about 10 to about 19.9, or from about 11 to about 19, or from about 12 to about 18, or from about 13 to about 17.5, or from about 14 to about 17, or other values. As an option, the nonionic surfactant is a poloxamer which has an HLB value of 16 or more.

In BASF's PLURONIC® code, the alphabetical designation can be derived from the physical form of the product at room temperature: L for liquids, P for pastes, and F for flake (solid) forms. In the numerical designation, the last digit multiplied by 10 may indicate the approximate percentage (w/w) of the hydrophilic portions in the PLURONIC® copolymer. Commercial names of the poloxamer which can be used in the present methods and compositions can include, for example, PLURONIC® F38, PLURONIC® F68, PLURONIC® F88, PLURONIC® F98, PLURONIC® F108, PLURONIC® F87, PLURONIC® P105, and PLURONIC® F127. PLURONIC® F108, for example, can comprise about 80% PEO (total):about 20% PPO on a weight:weight (w/w) basis, and an average molecular weight of about 14,600 g/mol.

The non-ionic surfactant can be or include or contain at least one EO/PO alkoxylate. The EO/PO alkoxylate can have an average molecular weight of from about 1,000 to about 10,000 Daltons. Any desirable ethylene oxide/propylene oxide (EO/PO) alkoxylate can be used. The EO/PO alkoxylate can include any suitable number of ethylene oxide and/or propylene oxide units. For example, the alkoxylate can have from about 2 to about 2,000, from about 10 to about 1,000, from about 25 to about 750, from about 50 to about 500, from about 75 to about 400, from about 100 to about 250, or greater than 2,000 alkylene oxide groups. The alcohol portion of the alkoxylate can be of any suitable length. The alcohol portion can be, for example, methanol, ethanol, propanol, butanol, and the like, or any combination thereof. The alcohol can be a primary alcohol, secondary alcohol, tertiary alcohol, or any combination thereof. The alcohol can be linear, cyclic, saturated, unsaturated, conjugated, substituted, homogenous, heterogeneous, or any combination thereof. The alkoxylate can be a copolymer, block copolymer, random copolymer, alternating copolymer, statistical copolymer, graft copolymer, or any combination thereof. The alkoxylate can include at least one homopolymer, at least one copolymer, or any combination thereof. EO/PO alkoxylates are available, for example, Tergitol XD from Dow Chemical Company, T-Det XD from Harcros Chemicals Kansas City, Kans. Midland, Mich., Perstorp Holding AB, Perstorp, Sweden, INEOS Group AG, Rolle, Switzerland, and Stepan Chemical Company Northfield, Ill.

The non-ionic surfactant can be or include one or more block polymers of the type PEO-PPO-PEO or random PEO-PPO polymers. TRITON-X-100 (polyethylene glycol p-(1,1,3,3-tetramethylbutyl)-phenyl ether), which is a non-ionic surfactant that contains a polyethylene glycol moiety, can be used. Examples of just a few of the polymeric surfactants that can be used include the following: polyoxyethylenesorbitan monopalmitate (TWEEN 40); polyethylene glycol sorbitan monolaurate, polyoxyethylenesorbitan monolaurate (TWEEN 20); TERGITOL 15-S-20; TERGITOL 15-S-30; TERGITOL 15-S-40; poly(ethylene glycol)-block-poly(propylene glycol)-block-poly(ethylene glycol) (PEG-PPG-PEG, PLURONIC® F-68); poly(ethylene glycol)-block-poly(propylene glycol)-block-poly(ethylene glycol) (PEG-PPG-PEG, PLURONIC® F-108); polyoxyethylene (150) dinonylphenyl ether, polyoxyethylene, dinonylphenyl and nonylphenyl ethers, branched (IG-EPAL® DM-970); polyoxyethylene (100) stearyl ether (BRIJ® S 100), poly(ethylene glycol)-block-poly(propylene glycol)-block-poly(ethylene glycol) (PEG-PPG-PEG, Pluronic® L-35); polyoxyethylene (40) nonylphenyl ether, branched (IGEPAL® CO-890); and polyethylene glycol hexadecyl ether, polyoxyethylene (20) cetyl ether (BRIJ® 58). These surfactants are available from Sigma-Aldrich (St. Louis, Mo.), except for the TERGITOL surfactants, which are available from Dow Chemical (Midland, Mich.).

The non-ionic surfactant, such as the polymeric surfactant, can have an average molecular weight (in Daltons) of from 1,000 to about 20,000, for instance, from about 2,000 to about 15,000, from about 3,000 to about 12,000, from about 5,000 to about 20,000, from about 10,000 to about 20,000, from about 12,000 to about 17,000, from about 13,500 to about 16,000, at least about 20,000, at least about 50,000, at least about 100,000, or at least about 500,000.

The modifier can also include as an option water. The water can be municipal tap water or deionized water or any other source of water. The water can be present, based on the total weight of the modifier, in an amount of from about 50 wt % to 90 wt %.

More preferred modified creping adhesive formulations are as follows. For instance, the modified creping adhesive formulation can be wherein the polypropylene glycol has an average molecular weight of from about 400 daltons to about 10,000 daltons, the quaternary ammonium compound comprises imidazoline, and the at least one non-ionic surfactant comprises i) an alkyl EO-PO copolymer and ii) an EO-PO block copolymer, wherein i) and ii) are different from each other.

As another example, the modified creping adhesive formulation can be wherein the polypropylene glycol has an average molecular weight of from about 400 daltons to about 10,000 daltons, the quaternary ammonium compound comprises imidazoline, the at least one non-ionic surfactant comprises i) an alkyl EO-PO copolymer and ii) an EO-PO block copolymer, wherein i) and ii) are different from each other, and wherein said creping adhesive comprises polyvinyl alcohol.

As another example, the modified creping adhesive formulation can be wherein the polypropylene glycol is present in an amount of from about 5 wt % to about 20 wt %, the quaternary ammonium compound is present in an amount of from about 1 wt % to about 15 wt %, the at least one non-ionic surfactant is present in an amount of from about 5 wt % to about 15 wt %, and the modifier further comprising water in an amount of from about 50 wt % to about 90 wt %, all based on total weight of said modifier.

The modified creping adhesive formulation that includes the emulsion can have an emulsion that is stable at a temperature range of from about −10° C. to about 50° C. or from about 0° C. to 50° C.

The present invention independently also is directed to the modifier itself prior to it being combined with at least one creping adhesive. The modifier has the components and amounts as described above.

The emulsion is preferably considered a microemulsion. The microemulsion can have average particle sizes of about 1 micron or less, such as from about 0.05 micron to about 1 micron, or from 0.1 micron to 0.9 micron, or from 0.2 micron to 0.8 micron, or from 0.3 micron to 0.7 micron.

Adhesive formulations of the present invention can provide less impact on tack profile performance, wherein the adhesive can impart high initial (wet) tack with tissue webs undergoing drying in the formation of a creped product on a Yankee dryer and alter coating film visco-elastic properties, for example, bulk and/or softness, so as to have a better response to a creping blade. The formulations can have less impact to initial wet tackiness.

The modifier and/or modified creping adhesive formulation can be formulated as stable, homogenous dispersions that are readily soluble and/or dispersible in water.

The solids content (SC) of a concentrate formulation of the present invention can contain up to about 60% by weight of the formulation, such as from about 20% to about 60% by weight, or from about 25% to about 60% by weight, or from about 30% to about 60% by weight, or from about 35% to about 55% by weight, or other amounts. A highly-concentrated product reduces bulk for shipping and storage. An end-user of the concentrated product, such as a paper company or other user, can dilute the concentrate to a desired solids content for the application, or can directly pump or otherwise transfer to a Yankee or rotary drum spray boom coating solution.

A balance is desirable with these adhesive formulations. As indicated, on one hand, enough tackiness is desired to hold the tissue on the dryer roller so that it can be creped, and, yet, enough release at the appropriate time is also desired so that the web comes off the roller at the creping blade without problems. Thus, a combination of initial (wet) tacky adhesive and delayed release qualities can be desirable, especially as a function of the moisture content of the web being dried. For example, it can be desirable to provide high initial (wet) tack immediately after a wet fiber web is transferred to a dryer roller, and after the web is substantially dried and near a creping blade or other separation device blade the formulation shows more release property and less tackiness. The adhesive formulations of the present invention can provide such a tack profile.

The modified creping adhesive formulation can be considered a blend, wherein each of the components in preparing the formulation can be mixed or otherwise combined together to form a formulation. Conventional mixing equipment, such as a tank with an agitator or in-line mixing using a static mixer, can be used to mix the components together. In preparing the formulation, any order of addition of the various components can be used to form the formulation.

The adhesive formulation, as an option, may contain additional additives. As an option, the formulation can have no additional additives included.

The modifier and/or the modified adhesive formulation of the present invention can be storage stable, meaning that the components that form the modifier and/or modified adhesive formulation do not significantly separate or settle over time. For instance, the storage stability of the adhesive formulations of the present invention can be at least 20 days, or at least 40 days, or at least 60 days, or at least three months, or at least six months, at a storage temperature of from −10° C. to 50° C. During this time period, the ingredients that form the adhesive formulation will not separate or settle to any significant degree (e.g., less than 1 wt % (based on the total weight of the adhesive formulation)) will separate or settle during this time period and, preferably, 0.1 wt % to 0 wt % will separate or settle during this time period).

The present invention can relate to the manufacture of creped paper including soft, absorbent, strong tissue paper webs and particularly to the mode of creping of such webs to attain adequate softness and adhesive characteristics in the web while minimizing operational difficulties. The paper web that is creped can be obtained from virgin pulp sources and/or from recycled sources, such as mixed office waste. The present invention is useful with paper webs formed from or including mixed office waste recycled sources, or sorted office papers. The adhesive formulation of the present invention can be considered a creping formulation that can be diluted with water for such manufacture of creped paper. The adhesive formulation of the present invention can be considered a Yankee dryer coating composition or Yankee dryer release coating composition that can be diluted with water. The adhesive formulation can be considered a TAD, NTT, or ATMOS fabric coating formulation and/or be considered useful with these processes/technologies.

It is known in the art to form a thin paper web from a slurry of water and fiber, dewater the wet web, and then at least partially dry the dewatered web. The web then can be conveyed or carried on a fabric to a large steam-heated rotary drum known as a Yankee dryer. The web commonly enters the dryer at a circumferential dryer position which is a major portion around the dryer from the zone of web de-contact from the drum. The web commonly enters the dryer at a circumferential dryer position that is preferably at least about halfway around, and more preferably at least about 75% around, the cylindrical dryer with respect to the zone of web de-contact from the drum. The de-contact zone can be equipped with a creping blade against which the web abuts so as to be pushed backwardly upon itself and foreshortened to attain the well-known tissue crepe paper structure. The creping action on a Yankee dryer requires that the web be well adhered to the dryer to effect a consistent and uniform creping action, and for example, to prevent flaring of the web from the dryer before or at the exit zone in the vicinity of the creping blade. In some instances, the web is presented to the dryer at a considerable moisture content that is typically as high as about 80%. Such webs accordingly have fiber consistencies at the point of contact with the dryer of about 20% or higher.

The adhesive formulation (e.g., in diluted form as indicated above) can be applied to a Yankee dryer or other cylindrical dryer used in such a creping process. The adhesive formulation can be applied on a continuous basis, semi-continuous basis, intermittent basis, or a one time basis to the cylindrical dryer surface prior to rotating, during rotation, or both. The adhesive formulation of the present invention can be applied to the surface of the cylindrical dryer (e.g., after the creping blade and before the web transfer location), to the fiber web prior to being applied onto the cylindrical dryer surface, or during application of the fiber web onto the cylindrical dryer surface, and/or after the fiber web application to the cylindrical dryer surface. The adhesive formulation can be applied by the use of one or more spray nozzles of a spray boom, a roll coater, an impregnation bath for the fiber web, or other coating device. The application rate or use rate of the adhesive formulation can be from 0.1 mg/m$^2$ of dryer surface to 40 mg/m$^2$ of dryer surface, such as from 0.1 mg/m$^2$ of dryer surface to 20 mg/m$^2$ of dryer surface, or from 0.1 mg/m$^2$ of dryer surface to 10 mg/m$^2$ of dryer surface, or from 1 mg/m$^2$ of dryer surface to 10 mg/m$^2$ of dryer surface, or from 5 mg/m$^2$ of dryer surface to 10 mg/m$^2$ of dryer surface, or other amounts.

In some modes of operation, commonly referred to as through-drying (also known as through air drying or TAD), contact of the web with a dryer surface is limited. In a through-drying operation, the web formed from the slurry of water and fiber is dewatered without significantly mechanically pressing the wet web using vacuum and hot air blast drying action. The web can be carried by a structured fabric during the through-air drying. As an option, the webs can be creped or foreshortened as part of the through-air drying process, wherein no further drying or creping of the web is performed on a Yankee dryer. As an alternative option, webs dried by TAD can be pressed after through-air drying to a Yankee dryer, which can be pre-coated with the adhesive formulation, using a knuckled fabric so that the web adheres to the dryer in closely spaced zones, with bulking of the web between the zones. Fabrics having as fine a count as 4,900 openings per square inch and above may serve the purpose. The fiber consistency of such webs when presented to a Yankee dryer may be from about 30% to about 90% fiber. Higher fiber-consistency webs commonly can require an adhesive to adequately secure the web to the dryer for completion of both the drying action and creping action.

Referring now to the drawings, FIG. 1 is a flow chart showing a series of steps included in a method according to the present invention that can be used for the formation of a creped tissue paper web (process 100). Such webs can have a finished basis weight, for example, in the range of from about 1 to about 80 pounds per 3,000 square feet, or from about 7 to about 40 pounds per 3,000 square feet, or other basis weights, and can be formed from aqueous fiber slurries. According to the present invention, in steps 101-102, a thin paper web can be formed from a slurry of water and fiber using a conventional web forming technique or other suitable method, and then in step 103, the web can be dewatered at least in part, such as at least partially dried. For example, the slurry can be directed to a conventional Fourdrinier drainage wire to form a fiber web. Partial dewatering of the fiber web can occur through the wire in a conventional manner. Further dewatering performed on the fiber web may comprise mechanical pressing, through-air drying operations, or combinations thereof. The fibrous web can be formed of various types of wood pulp based fibers which are used to make the above products, such as hardwood kraft fibers, softwood kraft fibers, hardwood sulfite fibers, softwood sulfite fibers, chemi-thermo-mechanical fibers, thermomechanical pulps, refiner mechanical pulps, recycled paper fibers, or other pulp fibers, or any combinations thereof. As an option, before transfer to the Yankee dryer or other rotary dryer, the fiber web can be dried to a fiber consistency of from about 10% by weight to about 90% by weight, or from about 20% by weight to about 80% by weight, or from about 25% by weight to about 75% by weight, or from about 40% by weight to about 60% by weight, or from 40% by weight to about 50% by weight, or other values, before being conveyed to the web dryer surface. For purposes herein, "fiber consistency" refers to the percentage value of dry fiber weight relative to the total weight of the web. As an option, the "moisture content" of the web may constitute most or all of the balance of the web weight. For example, the fibrous web, prior to application to the Yankee dryer or other rotary dryer, can have moisture contents, for example, of from about 90% by weight to about 10% by weight, or from about 80% to about 20% by weight, or from about 75% to about 25% by weight, or from about 60% by weight to about 40% by weight, or from about 50% to about 60% by weight, or other values, can be processed according to the methods of the present invention. Such webs accordingly would have fiber contents making up the additional weight % of the web. After dewatering, the web can then be conveyed, e.g., carried on a fabric, to a creping dryer or web dryer, which can be, for example, a steam-heated rotary drum dryer, referred to herein and elsewhere as a Yankee dryer. Before receiving the fiber web, an adhesive dryer surface of the Yankee dryer can be coated with an adhesive formulation of the present invention, which can involve steps 104-106 in this illustration.

In step 104 shown in FIG. 1, creping adhesive formulation components are fed, recirculated, or both into a mixing pot or other suitable mixing vessel, which can be equipped for agitation of its contents. Although not shown, the creping adhesive base formulation components can be fed into a closed loop system, such as a pressurized closed loop system, or can be fed into a once through application system. As an option, the creping adhesive composition can be prepared as an aqueous film-forming dispersion. In step 105, the resulting creping adhesive composition is coated on a dryer surface of a Yankee dryer or other large rotary dryer, and an adhesive dryer surface is formed. In step 106 shown in FIG. 1, the dewatered and partially dried wet paper web is conveyed, for example, carried on a fabric, and transferred to the adhesive dryer surface of a large rotary dryer, such as a steam-heated and/or hood heated rotary drum dryer, referred to herein and elsewhere as the Yankee dryer. A Yankee dryer can be a large diameter, typically about 8 to about 20 foot diameter drum, or other diameters, which is designed to be pressurized with steam to provide a hot surface for completing the drying of papermaking webs at the end of the papermaking process. The web can be transferred to the dryer, for example, at a circumferential dryer position, such as a position at least about halfway around, or at least about 75% around, the cylindrical dryer with respect to the zone of web de-contact where the creped web is separated and removed from the drum. The transfer fabric can be, for example, a transfer and impression fabric having knuckles which can compact a portion, e.g., about 20% or other amounts, of the surface of the web on a creping or Yankee dryer, to form a knuckled fiber web. As an option, the creping adhesive composition can retain the knuckled fiber web on the web dryer surface until a fiber consistency of the web is about 75% by weight or more, for example, at least about 95% by weight. In some modes of operation referred to herein as through-air drying, contact of the web with the dryer surface is limited. Methods and systems of through-drying operations which optionally may be used in the present invention include those such as described in U.S. Pat. No. 6,991,707 B2, which is incorporated herein by reference. The methods of the present invention can be used, for example, with through-air drying systems with creping methods, with Yankee dryer systems and methods, and with wet-crepe machines, systems, and methods. In step 107, the web can be retained on the adhesive dryer surface while carried around or on the dryer until reaching a de-contact zone. In step 108, the de-contact zone can be equipped with a creping device, such as a creping blade or doctor blade, against which the web abuts so as to be pushed or compacted backwardly upon itself and attain a recognizable tissue crepe paper structure. In step 109, the creped web can be recovered off the dryer. The web can be creped from the dryer to form a dried web having a fiber content or consistency, for example, of about 75% by weight or higher, for example, at least about 90% by weight, or at least about 95% by weight, or at least about 97% by weight consistency, or from about 85% to about 97% by weight consistency, or from about 90% to about 97% by weight consistency, and then can be wound into rolls or otherwise be collected off the dryer. At the creping stage, the fibrous web can have a water content, for example, of less than 25% by weight, or less than 15% by weight, or less than about 10% by weight, or less than about 7% by weight, or less than about 5% by weight, or from about 10% to about 3% by weight, or other amounts.

Figure 2:
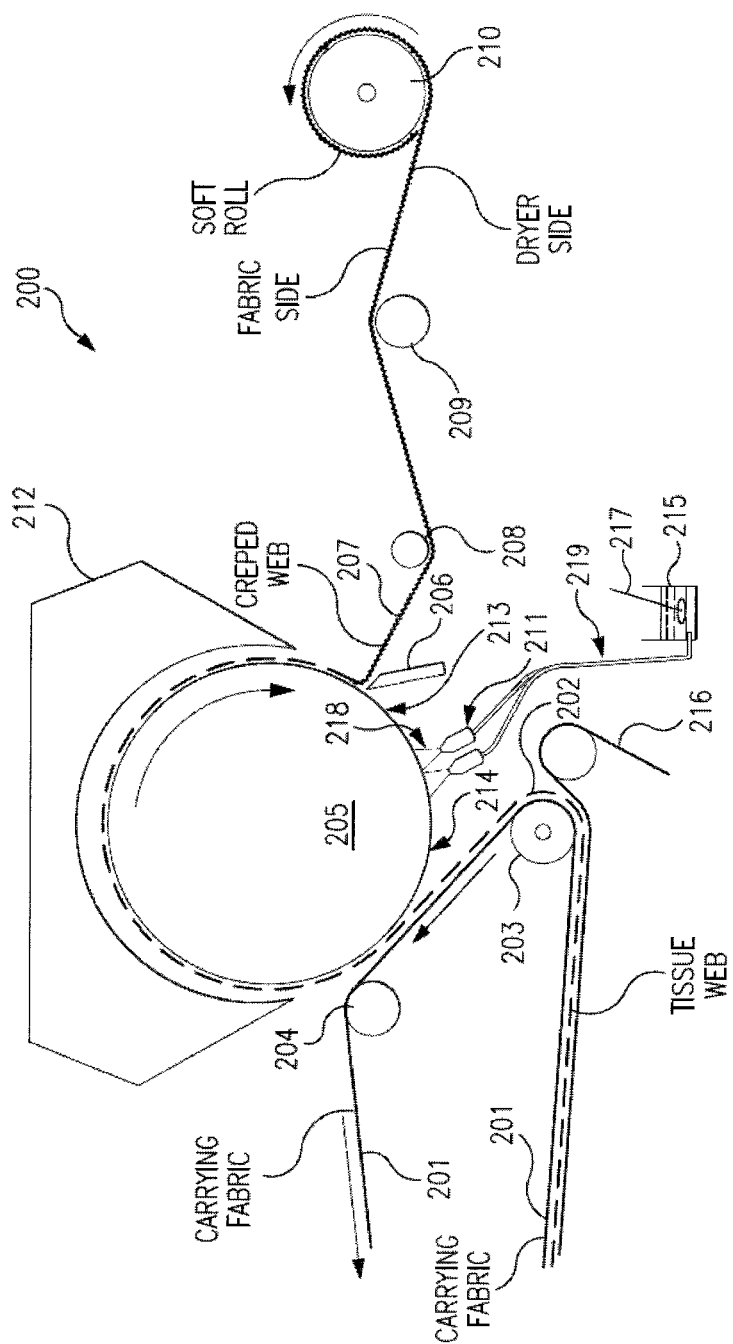
FIG. 2 is a schematic illustration of a creping system with a Yankee dryer that can be used to perform a creping method according to the present invention.

Referring to FIG. 2, a system 200 is shown for creping tissue with applying of a creping adhesive composition 218 to a Yankee dryer 205 according to a method of the present invention. The transfer and impression fabric designated reference numeral 201 can carry the formed, dewatered and partially dried web 202 around turning roll 203 to the nip between press roll 204 and Yankee dryer 205. A supplemental lower carrier designated at 216 may also be employed to carry the web in sandwich fashion, which may be particularly useful under conditions of higher web dryness. The fabric, web, and dryer move in the directions indicated by the arrows. The entry of the web into the dryer is well around the roll from creping blade 206, which, as is schematically indicated, crepes the traveling web from the dryer as indicated at 207. The creped web 207 exiting from the dryer passes over guide and tension rollers 208, 209 and is wound into a soft creped tissue roll 210. To adhere a partially dried and dewatered paper web 202 (at, for example, 10-90 wt. % fiber consistency) entering the dryer to the surface of the dryer, a spray boom 211 can be used to apply a creping adhesive composition 218 to the dryer surface 213 which is exposed after de-contacting the creped tissue web 207 from the dryer 205 to provide an adhesive dryer surface 214 ahead of the nip between the press roll 204 and Yankee 205. The spray boom 211 can be a single spray boom or multi-spray boom, such as a dual-spray boom as illustrated. The spray boom can include an overspray collection container (not shown). The spray boom 211 is fluidly connected 219 to a mixing pot 215 for feeding creping adhesive composition from the mixing pot. The mixing pot 215 can be equipped with an agitator 217. The adhesive formulation components can be introduced into the mixing pot 215 in any convenient manner. The resulting creping adhesive composition can be pumped or otherwise fed under pressure to the nozzle sprayer(s) of the spray boom 211. To promote drying of the web on the dryer, the Yankee 205 can be internally steam heated by conventional or other suitable arrangements (not shown), externally heated using a hood 212, or using both. This sprayed composition 218 optionally may be applied to the traveling web 202 directly, but is preferably directly sprayed onto the dryer surface 213, such as to limit the pickup of adhesive by the web and to limit the penetration of adhesive through the web to the carrying fabric. Sprayer systems and arrangements which can be adapted and used in methods of the present invention include, for example, those described in U.S. Pat. No. 6,465,047 B1, which is incorporated herein by reference in its entirety.

Figure 3:
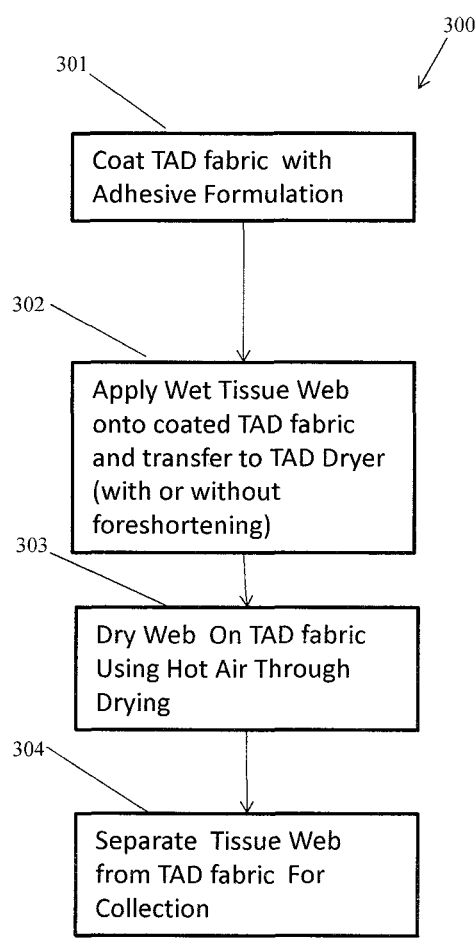
FIG. 3 is a process flow chart illustrating a process according to the present invention.

FIG. 3 is a flow chart showing a series of steps included in a method according to the present invention that can be used for the formation of a dried tissue paper web using a TAD coating process and without a Yankee (process 300). In step 301, a TAD fabric can be coated with an adhesive formulation. The adhesive formulation used for this method can include PVOH, as an option. The PVOH can be used as a co-additive to build up a sufficient coating. In step 302, a wet tissue web can be applied onto the coated surface of the TAD fabric. The wet tissue optionally can be foreshortened before it is transferred onto the coated TAD fabric to induce creping-like effects on the web. Techniques for foreshortening a wet tissue web are known, which can be applied, such as by transferring a newly formed wet tissue web form the forming fabric or wire to a slower moving transfer fabric, which in turn transfers the web to a TAD fabric. Methods and equipment arrangements for foreshortening a wet tissue web which can be applied to a TAD operation are shown, for example, in U.S. Pat. No. 5,888,347, which is incorporated herein by reference in its entirety. In step 303, the tissue web is dried on the TAD fabric as the layup of these layers is conveyed through at least one dryer in which hot air is passed through the tissue web. In step 304, after exiting the dryer, the dried tissue web is separated from the TAD fabric for collection. As an option, no further drying or creping processing need be applied to the tissue web that has been processed in the TAD operation.

Figure 4:
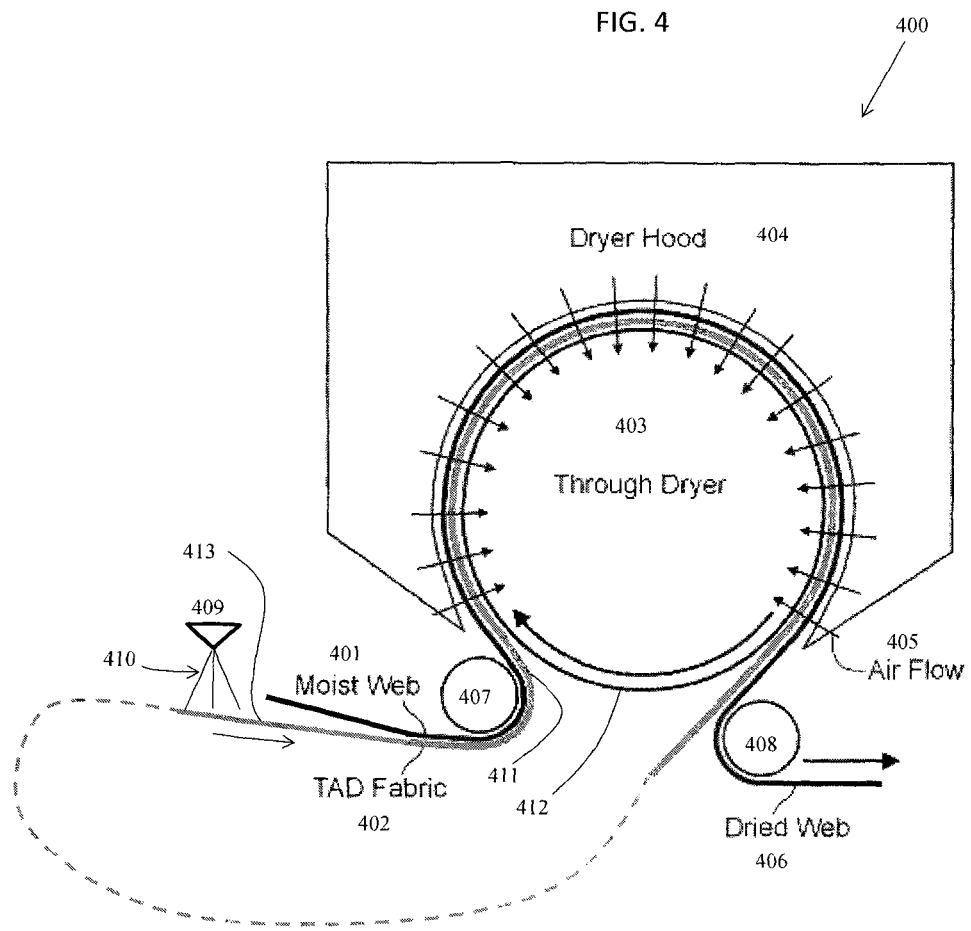
FIG. 4 is a schematic illustration of a TAD dryer system that can be used to perform a method according to the present invention.

FIG. 4 shows a TAD system that includes a TAD fabric coater and through-air dryer unit of the TAD system. In system 400 shown in this figure, a moist tissue web 401 is placed on a coated surface 413 of TAD fabric 402. The TAD fabric 402 can be precoated at coating station 409 with a formulation 410. To simplify this illustration, only segments of the TAD fabric 402 and the moist tissue web 401 are shown where they pass through the through-air dryer 403. The moist tissue web 401 can be received from a paper forming unit (not shown), such as a conventional wire forming unit. The TAD fabric 402 can have an endless loop or belt structure, as indicated by the dashed lines, which can be guided around additional rollers (not shown) to provide a continuous structure. The resulting layup 411 of the moist tissue web and coated TAD fabric is conveyed around the rotatable through-air dryer 403 with hot air inflow 405 from a dryer hood 404, and then the dried web 406 is separated from the TAD fabric 402 after the layup emerges from the through-air dryer unit 403. Once the dried web 406 is separated from the TAD fabric 402, the TAD fabric 402 can be directed through a cleaning section (not shown), e.g., a spray washing station, before it is directed back to the coating station 409 for re-use (as indicated in dashed lines). Directional arrows shown for TAD fabric 402, through-air dryer 403, and dried web 406 indicate directions of movement of these components during processing in the TAD system. The TAD fabric itself can be a foraminous structure which can permit air-flow through its thickness. The formulation 410 can be applied to a surface of the TAD fabric 402 at a coating rate useful for imparting a good balance of adhesion and release between the components without blinding the TAD fabric to airflow. The coating rate of the adhesive formulation on the TAD fabric in this through-air drying process can range from 0.1 mg/m$^2$ to about 100 mg/m$^2$ of TAD fabric surface, such as from 1 mg/m$^2$ to 80 mg/m$^2$ of TAD fabric surface, or from 2 mg/m$^2$ to 70 mg/m$^2$ of TAD fabric surface, or from 5 mg/m$^2$ to 50 mg/m$^2$ of TAD fabric surface or other amounts. The through-air dryer 403 can be a rotatable drum that has an outer drum surface 412 used for supporting the layup 411. Roll 407 can be used to guide and convey the layup to the drum surface 412. As an option, a moist web 401 transferred to coated TAD fabric 402 can then pass over a porous through-air dryer 403, such as a honeycomb roll or drum, through which heated air passes from drying hood 404 after impinging and passing through the layup. The hot air 405 passing through the web 401 in the layup can provide high heat transfer rates and effective drying without significant compression of the web. After the TAD fabric 402 and the dried paper web 406 exit the through-air dryer 403, the dried paper web 406 can be separated from the TAD fabric 402 by a separation device comprising, for example, a separation roll 408 as shown or, in the alternative, a transfer device such as a suction roll (not shown) or like devices useful for separating a dried paper web from a TAD fabric. The separation roll 408 or other separation device may be further assisted by an air jet device (not shown), such as an air knife, disposed within the loop of the TAD fabric 402 generally opposite the separation device which can blow air through the TAD fabric to impinge a surface of the dried paper web 406 and push it away from the TAD fabric. The dried web 406 can be transported from separation roll 408 to a reel-up (not shown) by, for example, a permeable transport fabric (not shown). Though a single inward flow through-air dryer 403 is shown for drying the web 401, it will be appreciated that a single outward flow through-air dryer may be used instead of an inward flow through-air dryer, or a plurality of inward flow through-air dryers in a series or a plurality of outward flow through-air dryers in a series may be used, or at least one inward flow through-air dryer may be used in combination with at least one outward flow through-air dryer in series.

This TAD system can be used in tissue or paper production without a Yankee dryer or with a Yankee dryer. As an option, the through-air dryer 403 can comprise the final drying section for the paper web 406. The wet tissue web can be foreshortened without use of a Yankee for creping. As an option, to foreshorten a tissue web without use of a Yankee, wet tissue web 401 can be transferred using a rush transfer technique from a forming section wire (not shown) to a second slower-moving transfer fabric (not shown) to foreshorten the moist paper web before it is transferred to the coated TAD fabric 402. Configurations which can be used to foreshorten a wet tissue web from the forming wire section and before through-drying are shown for example in the incorporated U.S. Pat. No. 5,888,347.

Figure 5:
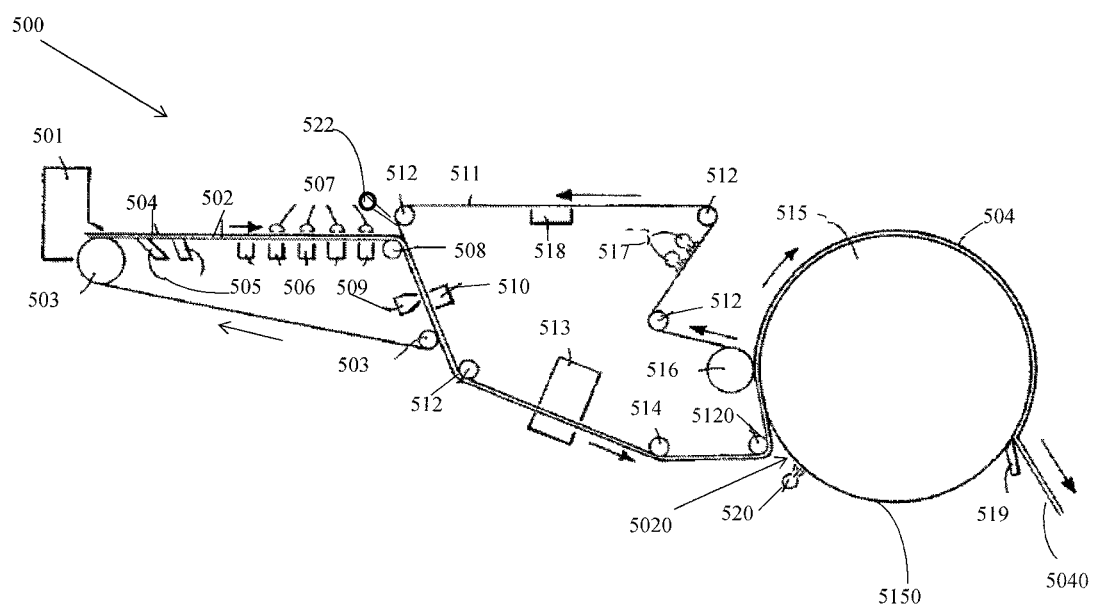
FIG. 5 is a schematic illustration of a creping system with through-air drying (TAD) and a Yankee roll that can be used to perform a creping method according to the present invention.
Figure 6:
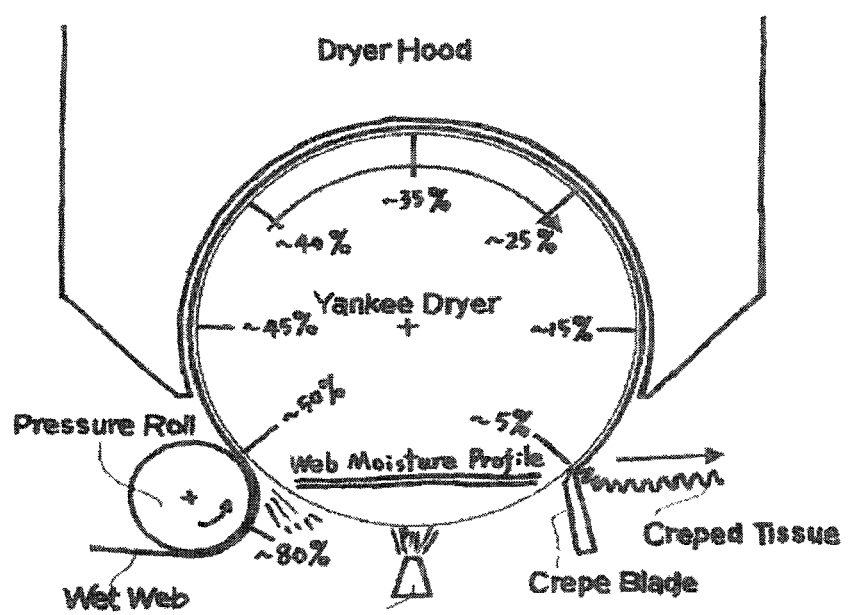
FIG. 6 is a schematic illustration of a creping system that includes illustrative moisture content values with respect to locations around the circumference of a Yankee dryer surface which can be used in a creping method according to the present invention.

FIG. 5 is a schematic illustration of a web drying and creping system which includes a combination of through-air drying (TAD) and a Yankee. In system 500 shown in this figure, a papermaking furnish can be delivered from a headbox 501 to a Fourdrinier wire 502 supported by a roll 503. An uncompacted paper web 504 is formed, and the wire 502 can pass over optional forming boards 505. Toward the dry end of the forming section, the wire 502 with the wet paper web 504 supported thereon can pass over a plurality of suction boxes 507. Five suction boxes are shown in the illustration, the last four of which may be equipped with steam nozzles 506, or other numbers of these boxes may be used. After passing the vacuum boxes 507, the wire and the moist web can pass around a wire return roll 508 where the web 504 is sandwiched between wire 502 and TAD fabric 511. The TAD fabric can be a structured fabric used for impressing a three-dimensional structure against a confronting surface of web 504. As an option, the TAD fabric 511 can be coated on its upper surface with the adhesive formulation, such as using a sprayer 522, prior to contacting web 504 between rollers 508 and 512. The web 504 can be conveyed downwardly between a slotted steam nozzle 509 and a vacuum box 510. After this point, the paper web 504 can transferred without compaction to the selected TAD fabric 511 and continues over a TAD fabric return roll 512 to a hot air blast dryer 513 used for through-drying of web 504. From there, the TAD fabric 511 and the thermally pre-dried paper web can pass over a straightening roll 514, which can prevent the formation of wrinkles in the imprinting fabric, and over another TAD fabric return roll 5120 to be transferred onto the surface 5150 of a Yankee dryer drum 515. The knuckles of the imprinting fabric 511 can then be impressed into the pre-dried but as yet uncompacted paper sheet 504 by the pressure roll 516. The TAD fabric 511 then can return to the wire 502 over several TAD fabric return rolls 512, and can be cleaned (e.g., washed) free of clinging fibers by sprays 517 and dried by vacuum box 518 during its return.

The impressed paper sheet 504 continues from the impression nip roll 516 along the periphery of the Yankee drum dryer 515 for drying and is creped from the Yankee dryer surface with a creping blade 519, such as with a doctor blade. The creped web 5040 can be wound from the dryer surface after creping, such as in a similar manner as shown in the system of FIG. 1. The surface 5150 of the Yankee dryer can be sprayed with the adhesive formulation and any other co-additives from sprayer 520 to form a coating 5020 on the dryer surface. The coating 5020 can improve the bond between the knuckle imprints of the paper sheet and the Yankee dryer surface during drying, and permit release of the web at creping. This sprayed composition optionally may be applied to the traveling web 504 at or before the transfer roller 5120 adjacent the Yankee drum 515, but is preferably directly sprayed onto the dryer surface 5150. To promote drying of the web on the dryer, the Yankee 515 can be internally steam heated by conventional or other suitable arrangements (not shown), externally heated using a hood (not shown), such as shown in FIG. 1, or using both.

The NTT has a belt in the "press section" that imparts a 3 dimensional (3D) pattern in the sheet prior to the Yankee roller and ATMOS has a belt/felt that imparts a 3D pattern to the sheet prior to the Yankee roller. NTT, ATMOS, and TAD add structure to the sheet before the Yankee roller. A critical part of the chemistry for the Yankee is to not destroy the structure that has been placed in the sheet. Once a 3D structure is created, such as by NTT or ATMOS or TAD, less of the sheet actually contacts the Yankee coating, and thus the creping adhesives need to be good at picking up the sheet (considered the initial wet tack property of the creping adhesive). Structured sheets (e.g., 3D structured sheets) are known to be more problematic and require more add on. PVOH is used in many cases because it builds a thick coating and is tacky when wet. However at the creping blade it does not perform well. It adheres too well to the Yankee surface and is hard to remove. Streaks and build up are common when using PVOH. Modifying the PVOH with other chemistry is necessary and the present invention accomplishes this. In general, the present invention is especially useful as a creping adhesive for a creping process, such as on a dryer roller or other roller, where the sheet has been imparted with a structured pattern such as a 3 dimensional pattern.

Creping systems, methods, and adhesives are described in the following U.S. Patent Nos. which are incorporated herein in their entireties by reference: U.S. Pat. Nos. 3,640,841; 4,304,625; 4,440,898; 4,788,243; 4,994,146; 5,025,046; 5,187,219; 5,326,434; 5,246,544; 5,370,773; 5,487,813; 5,490,903; 5,633,309; 5,660,687; 5,846,380; 4,300,981; 4,063,995; 4,501,640; 4,528,316; 4,886,579; 5,179,150; 5,234,547; 5,374,334; 5,382,323; 5,468,796; 5,902,862; 5,942,085; 5,944,954; 3,301,746; 3,879,257; 4,684,439; 3,926,716; 4,883,564; and 5,437,766.

The adhesive formulation of the present invention can be, as an option, in the form of a concentrated product, which can be diluted, such as on site of the creping location in a mix pot or in line with other materials that are to be sprayed on the cylindrical dryer. With the use of the adhesive formulations of the present invention, a superior balance of adhesion and release properties of the fiber web from the surface of a dryer or TAD, ATMOS or NTT fabric can be achieved. Comparable or better tack profiles using a biodegradable additive at lower use rates of conventional PVOH or wet strength resins can be obtained with adhesive formulations of the present invention.

The adhesive formulation of the present invention can be used in other applications of the paper industry or other industries. The adhesive formulation of the present invention can be considered biodegradable, and/or non-toxic, and/or contains one or more food-grade components.

The present invention will be further clarified by the following examples, which are intended to be exemplary of the present invention.

EXAMPLES

Example 1

In this example, adhesive formulations were prepared and tested for bonding force and creping force. In this experiment, five different creping formulations were prepared. The "Control, PVOH" was 100% polyvinyl alcohol as the active, from Selvol 523 from Sekisui Corporation, which is a 2.5 wt % PVOH aqueous solution. The present invention used a microemulsion of a polypropylene glycol (PT2000 from Dow Chemical) (10 wt %), an alkyl EO/PO copolymer with a MW of about 3000 (3 wt %), an EO/PO block copolymer (Pluronic F-127) (4 wt %), and Imidazoline Quat from Buckman Laboratories, Inc., and the balance was water. This modifier in an amount of either 2.5 wt % or 5 wt % was combined with the same type of PVOH as used in the Control.

Each of these creping formulations were tested and the results are set forth in Table 1 and Table 2 below.

TABLE 1

| Bonding Force, grams | Control, PVOH | Present Invention (PVOH + 2.5% PPG microemulsion modifier) |
|---|---|---|
| Initial Wet Tack | 330 | 325 |
| End Dry Tack | 1260 | 1010 |

TABLE 2

| | Control, PVOH | Present Invention (PVOH + 2.5% PPG microemulsion modifier) | Present Invention (PVOH + 5% PPG microemulsion modifier) |
|---|---|---|---|
| Creping Force, grams | 1760 | 1440 | 1260 |

For Table 1, the bonding force in grams was measured (initial wet tack and end dry tack). The results show that the present invention had an initial wet tack that was very similar to the Control (100% unmodified PVOH). The initial wet tack of the PVOH is very acceptable and desirable in creping processes and thus the present invention maintaining this initial tack is a positive feature. For the End Dry Tack, it is known the PVOH alone has somewhat undesirable end dry tack, as its tack is too strong and therefore it can be difficult to remove the creped paper from the drum or dryer and results in damage to the paper and/or damage to the drum and/or more wear/tear in general on the parts used for creping. In Table 1, the End Dry Tack for PVOH (Control) was 1260 g. For the present invention's adhesive, the dry tack was 1010 g, which was significantly lower and more desirable as this permits enough tack to hold the creped paper but also permits it to be more easily removed.

The ability to more easily remove the creped paper is measured by the results in Table 2. For Table 2, the creping force in grams was measured where a lower number is better. The present invention was better in a side by side comparison of the 2.5 wt % amount and the 5 wt % amount compared to the "Control." This shows that significantly less force is needed to remove the creped paper with the formulation of the present invention, which is a very desirable property. These results show that the PVOH has been successfully modified by the present invention and an improved adhesive has been created.

The present invention includes the following aspects/embodiments/features in any order and/or in any combination:

1. A modified creping adhesive formulation comprising:
   a. at least one creping adhesive, and
   b. a modifier,
   wherein said modifier comprises an emulsion of polypropylene glycol, at least one quaternary ammonium compound, and at least one non-ionic surfactant.
2. The modified creping adhesive formulation of any preceding or following embodiment/feature/aspect, wherein said at least one non-ionic surfactant consists of two different non-ionic surfactants.
3. The modified creping adhesive formulation of any preceding or following embodiment/feature/aspect, wherein said modifier further comprises water.
4. The modified creping adhesive formulation of any preceding or following embodiment/feature/aspect, wherein said at least one creping adhesive comprises polyvinyl alcohol.
5. The modified creping adhesive formulation of any preceding or following embodiment/feature/aspect, wherein said polypropylene glycol comprises at least one polypropylene glycol having an average molecular weight of from about 400 to about 10,000 daltons.
6. The modified creping adhesive formulation of any preceding or following embodiment/feature/aspect, wherein said polypropylene glycol comprises at least one polypropylene glycol having an average molecular weight of from about 1,000 to about 3,000 daltons.
7. The modified creping adhesive formulation of any preceding or following embodiment/feature/aspect, wherein said at least one quaternary ammonium compound comprises imidazoline or an imidazoline derivative.
8. The modified creping adhesive formulation of any preceding or following embodiment/feature/aspect, wherein said at least one quaternary ammonium compound comprises a mono quaternary ammonium compound.
9. The modified creping adhesive formulation of any preceding or following embodiment/feature/aspect, wherein said imidazoline derivative is a reaction product of diethylene triamine and a fatty acid and further reacted with dimethyl sulfate, wherein the fatty acid is a 12-20 carbon chain fatty acid.
10. The modified creping adhesive formulation of any preceding or following embodiment/feature/aspect, wherein said quaternary ammonium compound is dimethyl ditallow ammonium chloride, dimethyl benzyl ammonium chloride, or any combination thereof.
11. The modified creping adhesive formulation of any preceding or following embodiment/feature/aspect, wherein said at least one non-ionic surfactant is polyalkylene glycol monobutyl ether.
12. The modified creping adhesive formulation of any preceding or following embodiment/feature/aspect, wherein said at least one non-ionic surfactant is an alkyl EO-PO copolymer.
13. The modified creping adhesive formulation of any preceding or following embodiment/feature/aspect, wherein said at least one non-ionic surfactant is an EO-PO block copolymer.
14. The modified creping adhesive formulation of any preceding or following embodiment/feature/aspect, wherein said at least one non-ionic surfactant is i) an alkyl EO-PO copolymer and ii) an EO-PO block copolymer, wherein i) and ii) are different from each other.
15. The modified creping adhesive formulation of any preceding or following embodiment/feature/aspect, wherein said at least one non-ionic surfactant is i) an alkyl EO-PO copolymer and ii) a poloxamer, wherein i) and ii) are different from each other.
16. The modified creping adhesive formulation of any preceding or following embodiment/feature/aspect, wherein said polypropylene glycol has an average molecular weight of from about 400 to about 10,000 daltons, said quaternary ammonium compound comprises imidazoline, said at least one non-ionic surfactant comprises i) an alkyl EO-PO copolymer and ii) an EO-PO block copolymer, wherein i) and ii) are different from each other.

17. The modified creping adhesive formulation of any preceding or following embodiment/feature/aspect, wherein said polypropylene glycol has an average molecular weight of from about 400 to about 10,000 daltons, said quaternary ammonium compound comprises imidazoline, said at least one non-ionic surfactant comprises i) an alkyl EO-PO copolymer and ii) an EO-PO block copolymer, wherein i) and ii) are different from each other, and wherein said creping adhesive comprises polyvinyl alcohol.

18. The modified creping adhesive formulation of any preceding or following embodiment/feature/aspect, wherein said polypropylene glycol is present in an amount of from about 5 wt % to about 20 wt %, said quaternary ammonium compound is present in an amount of from about 1 wt % to about 15 wt %, said at least one non-ionic surfactant is present in an amount of from about 5 wt % to about 15 wt %, and said modifier further comprising water in an amount of from about 50 wt % to about 90 wt %, all based on total weight of said modifier.

19. The modified creping adhesive formulation of any preceding or following embodiment/feature/aspect, wherein said creping adhesive is present in an amount of from about 85 wt % to about 99 wt % and said modifier is present in an amount of from about 1 wt % to about 5 wt %, based on total weight of said modified creping adhesive formulation.

20. The modified creping adhesive formulation of any preceding or following embodiment/feature/aspect, wherein said emulsion is a microemulsion with particle sizes of below 0.1 micron.

21. The modified creping adhesive formulation of any preceding or following embodiment/feature/aspect, wherein said emulsion is stable at a temperature of from −10 deg C. to about 50 deg C.

22. A modifier for a creping adhesive formulation, said modifier comprises an emulsion of polypropylene glycol, at least one quaternary ammonium compound, and at least one non-ionic surfactant.

23. The modifier of any preceding or following embodiment/feature/aspect, wherein said at least one non-ionic surfactant consists of two different non-ionic surfactants.

24. The modifier of any preceding or following embodiment/feature/aspect, wherein said modifier further comprises water.

25. The modifier of any preceding or following embodiment/feature/aspect, wherein said polypropylene glycol comprises at least one polypropylene glycol having an average molecular weight of from about 400 to about 10,000 daltons.

26. The modifier of any preceding or following embodiment/feature/aspect, wherein said polypropylene glycol comprises at least one polypropylene glycol having an average molecular weight of from about 1,000 to about 3,000 daltons.

27. The modifier of any preceding or following embodiment/feature/aspect, wherein said at least one quaternary ammonium compound comprises imidazoline or an imidazoline derivative.

28. The modifier of any preceding or following embodiment/feature/aspect, wherein said at least one quaternary ammonium compound comprises a mono quaternary ammonium compound.

29. The modifier of any preceding or following embodiment/feature/aspect, wherein said imidazoline derivative is a reaction product of diethylene triamine and a fatty acid and further reacted with dimethyl sulfate, wherein the fatty acid is a 12-20 carbon chain fatty acid.

30. The modifier of any preceding or following embodiment/feature/aspect, wherein said quaternary ammonium compound is dimethyl ditallow ammonium chloride, dimethyl benzyl ammonium chloride, or any combination thereof.

31. The modifier of any preceding or following embodiment/feature/aspect, wherein said at least one non-ionic surfactant is polyalkylene glycol monobutyl ether.

32. The modifier of any preceding or following embodiment/feature/aspect, wherein said at least one non-ionic surfactant is an alkyl EO-PO copolymer.

33. The modifier of any preceding or following embodiment/feature/aspect, wherein said at least one non-ionic surfactant is an EO-PO block copolymer.

34. The modifier of any preceding or following embodiment/feature/aspect, wherein said at least one non-ionic surfactant is i) an alkyl EO-PO copolymer and ii) an EO-PO block copolymer, wherein i) and ii) are different from each other.

35. The modifier of any preceding or following embodiment/feature/aspect, wherein said at least one non-ionic surfactant is i) an alkyl EO-PO copolymer and ii) a poloxamer, wherein i) and ii) are different from each other.

36. The modifier of any preceding or following embodiment/feature/aspect, wherein said polypropylene glycol has an average molecular weight of from about 400 to about 10,000 daltons, said quaternary ammonium compound comprises imidazoline, said at least one non-ionic surfactant comprises i) an alkyl EO-PO copolymer and ii) an EO-PO block copolymer, wherein i) and ii) are different from each other.

37. The modifier of any preceding or following embodiment/feature/aspect, wherein said polypropylene glycol is present in an amount of from about 5 wt % to about 20 wt %, said quaternary ammonium compound is present in an amount of from about 1 wt % to about 15 wt %, said at least one non-ionic surfactant is present in an amount of from about 5 wt % to about 15 wt %, and said modifier further comprising water in an amount of from about 50 wt % to about 90 wt %, all based on total weight of said modifier.

38. The modifier of any preceding or following embodiment/feature/aspect, wherein said emulsion is a microemulsion with particle sizes of below 0.1 micron.

39. The modifier of any preceding or following embodiment/feature/aspect, wherein said emulsion is stable at a temperature of from −10 deg C. to about 50 deg C.

40. The modifier of any preceding or following embodiment/feature/aspect, wherein said at least one non-ionic surfactant has an HLB value of 12 or higher.

41. A process for creping a fiber web, comprising:
providing a rotating cylindrical dryer, including a dryer surface,
applying a formulation comprising the modified creping adhesive formulation of claim 1 to the dryer surface,
conveying a fiber web to the dryer surface,
drying the fiber web on said dryer surface to form a dried fiber web, and
creping the dried fiber web from the dryer surface.

42. The process of any preceding or following embodiment/feature/aspect, wherein coating film tack of the formulation increases by at least 1.5 times (1.5×) when moisture content of said fiber web decreases from about 50 wt % to about 30 wt % during said drying of said fiber web on said dryer surface, and then decreases by at least 1.5 times (1.5×) when moisture content of said fiber web decreases from about 30 wt % to about 10 wt % during said drying of said fiber web on said dryer surface.
43. The process of any preceding or following embodiment/feature/aspect, wherein said modified creping adhesive formulation has 0.5 wt % to 10 wt % total solids content, and water is present in the formulation in an amount of from 99.5 wt % to 90 wt %.
44. The process of any preceding or following embodiment/feature/aspect, wherein said creping adhesive at least one of polyvinyl alcohol, polyamide epichlorohydrin polymer (PAE), poly(amidoamine) epichlorohydrin polymer (PAAE), or any combinations thereof.
45. The process of any preceding or following embodiment/feature/aspect, further comprising predrying the fiber web using through-air drying before the fiber web is transferred to the dryer surface using a structured fabric to convey the web to the dryer surface, wherein at least one of the structured fabric and the dryer surface is precoated with said modified creping adhesive formulation before contacted with the fiber web.
46. The process of any preceding or following embodiment/feature/aspect, wherein said modified creping adhesive formulation is applied in an amount of from about 0.5 mg/m$^2$ of dryer surface to 40 mg/m$^2$ of dryer surface.
47. A process of making a creped fiber web, comprising:
applying a formulation comprising the modified creping adhesive formulation of claim 1 to a TAD fabric to provide a coated surface, wherein the TAD fabric is arranged in an endless loop such that the TAD fabric passes around a foraminous dryer roll of a through-air dryer (TAD),
transferring a fiber web to the coated surface of the TAD fabric;
conveying the coated TAD fabric with the fiber web carried thereon around the dryer roll with passing of heated air through the fiber web to provide a dried web without drying of the fiber web on a Yankee dryer, and
separating the dried web from the TAD fabric for collection of the dried web, wherein the dried web comprises at least one creped property.

The present invention can include any combination of these various features or embodiments above and/or below as set forth in sentences and/or paragraphs. Any combination of disclosed features herein is considered part of the present invention and no limitation is intended with respect to combinable features.

Applicants specifically incorporate the entire contents of all cited references in this disclosure. Further, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

What is claimed is:
1. A modified creping adhesive formulation comprising:
a. at least one creping adhesive, and
b. a modifier,
wherein said modifier comprises an emulsion of polypropylene glycol, at least one quaternary ammonium compound, and at least one non-ionic surfactant,
wherein said at least one quaternary ammonium compound either comprises i) an imidazoline derivative that is a reaction product of diethylene triamine and a fatty acid and further reacted with dimethyl sulfate, wherein the fatty acid is a tall oil fatty acid, or ii) a dimethyl ditallow ammonium chloride, a dimethyl benzyl ammonium chloride, or any combination thereof.
2. The modified creping adhesive formulation of claim 1, wherein said at least one non-ionic surfactant consists of two different non-ionic surfactants.
3. The modified creping adhesive formulation of claim 1, wherein said modifier further comprises water.
4. The modified creping adhesive formulation of claim 1, wherein said at least one creping adhesive comprises polyvinyl alcohol.
5. The modified creping adhesive formulation of claim 1, wherein said polypropylene glycol comprises at least one polypropylene glycol having an average molecular weight of from 400 to 10,000 daltons.
6. The modified creping adhesive formulation of claim 1, wherein said polypropylene glycol comprises at least one polypropylene glycol having an average molecular weight of from 1,000 to 3,000 daltons.
7. The modified creping adhesive formulation of claim 1, wherein said at least one non-ionic surfactant is polyalkylene glycol monobutyl ether.
8. The modified creping adhesive formulation of claim 1, wherein said at least one non-ionic surfactant is an alkyl EO-PO copolymer.
9. The modified creping adhesive formulation of claim 1, wherein said at least one non-ionic surfactant is an EO-PO block copolymer.
10. The modified creping adhesive formulation of claim 1, wherein said at least one non-ionic surfactant is i) an alkyl EO-PO copolymer and ii) an EO-PO block copolymer, wherein i) and ii) are different from each other.
11. The modified creping adhesive formulation of claim 1, wherein said at least one non-ionic surfactant is i) an alkyl EO-PO copolymer and ii) a poloxamer, wherein i) and ii) are different from each other.
12. The modified creping adhesive formulation of claim 1, wherein said polypropylene glycol has an average molecular weight of from 400 to 10,000 daltons, said quaternary ammonium compound comprises imidazoline, said at least one non-ionic surfactant comprises i) an alkyl EO-PO copolymer and ii) an EO-PO block copolymer, wherein i) and ii) are different from each other.
13. The modified creping adhesive formulation of claim 1, wherein said polypropylene glycol has an average molecular weight of from 400 to 10,000 daltons, said quaternary ammonium compound comprises imidazoline, said at least one non-ionic surfactant comprises i) an alkyl EO-PO copolymer and ii) an EO-PO block copolymer, wherein i) and ii) are different from each other, and wherein said creping adhesive comprises polyvinyl alcohol.
14. The modified creping adhesive formulation of claim 1, wherein said polypropylene glycol is present in an amount of from 5 wt % to 20 wt %, said quaternary ammonium compound is present in an amount of from 1 wt % to 15 wt %, said at least one non-ionic surfactant is present in an amount of from 5 wt % to 15 wt %, and said modifier further comprising water in an amount of from 50 wt % to 90 wt %, all based on total weight of said modifier.

15. The modified creping adhesive formulation of claim 1, wherein said creping adhesive is present in an amount of from 85 wt % to 99 wt % and said modifier is present in an amount of from 1 wt % to 5 wt %, based on total weight of said modified creping adhesive formulation.

16. The modified creping adhesive formulation of claim 1, wherein said emulsion is a microemulsion with particle sizes of below 0.1 micron.

17. The modified creping adhesive formulation of claim 1, wherein said emulsion is stable at a temperature of from −10 deg C. to 50 deg C.

18. A modifier for a creping adhesive formulation, said modifier comprises an emulsion of polypropylene glycol, at least one quaternary ammonium compound, and at least one non-ionic surfactant, wherein said at least one quaternary ammonium compound either comprises i) an imidazoline derivative that is a reaction product of diethylene triamine and a fatty acid and further reacted with dimethyl sulfate, wherein the fatty acid is a tall oil fatty acid, or ii) a dimethyl ditallow ammonium chloride, a dimethyl benzyl ammonium chloride, or any combination thereof.

19. A process for creping a fiber web, comprising:
providing a rotating cylindrical dryer, including a dryer surface, applying a formulation comprising the modified creping adhesive formulation of claim 1 to the dryer surface,
conveying a fiber web to the dryer surface,
drying the fiber web on said dryer surface to form a dried fiber web, and
creping the dried fiber web from the dryer surface.

20. The process of claim 19, wherein coating film tack of the formulation increases by at least 1.5 times (1.5×) when moisture content of said fiber web decreases from about 50 wt % to about 30 wt % during said drying of said fiber web on said dryer surface, and then decreases by at least 1.5 times (1.5×) when moisture content of said fiber web decreases from about 30 wt % to about 10 wt % during said drying of said fiber web on said dryer surface.

21. The process of claim 19, wherein said modified creping adhesive formulation has 0.5 wt % to 10 wt % total solids content, and water is present in the formulation in an amount of from 99.5 wt % to 90 wt %.

22. The process of claim 19, wherein said creping adhesive at least one of polyvinyl alcohol, polyamide epichlorohydrin polymer (PAE), poly(amidoamine) epichlorohydrin polymer (PAAE), or any combinations thereof.

23. The process of claim 19, further comprising predrying the fiber web using through-air drying before the fiber web is transferred to the dryer surface using a structured fabric to convey the web to the dryer surface, wherein at least one of the structured fabric and the dryer surface is precoated with said modified creping adhesive formulation before contacted with the fiber web.

24. The process of claim 19, wherein said modified creping adhesive formulation is applied in an amount of from about 0.5 mg/m$^2$ of dryer surface to 40 mg/m$^2$ of dryer surface.

25. A process of making a creped fiber web, comprising:
applying a formulation comprising the modified creping adhesive formulation of claim 1 to a TAD fabric to provide a coated surface, wherein the TAD fabric is arranged in an endless loop such that the TAD fabric passes around a foraminous dryer roll of a through-air dryer (TAD),
transferring a fiber web to the coated surface of the TAD fabric;
conveying the coated TAD fabric with the fiber web carried thereon around the dryer roll with passing of heated air through the fiber web to provide a dried web without drying of the fiber web on a Yankee dryer, and
separating the dried web from the TAD fabric for collection of the dried web, wherein the dried web comprises at least one creped property.

26. The modifier of claim 18, wherein said emulsion is a microemulsion with particle sizes of below 0.1 micron.

\* \* \* \* \*